United States Patent
Li et al.

(10) Patent No.: US 12,323,325 B2
(45) Date of Patent: *Jun. 3, 2025

(54) METHOD FOR GENERATING SEGMENT LIST, METHOD FOR FORWARDING PACKET, DEVICE, AND SYSTEM IN SRV6 NETWORK

(71) Applicant: HUAWEI TECHNOLOGIES CO., LTD., Guangdong (CN)

(72) Inventors: Cheng Li, Boulogne Billancourt (FR); Zhenbin Li, Beijing (CN); Jun Gong, Beijing (CN); Guoyi Chen, Beijing (CN); Jie Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,926

(22) Filed: Jan. 24, 2024

(65) Prior Publication Data
US 2024/0283735 A1   Aug. 22, 2024

Related U.S. Application Data

(63) Continuation of application No. 17/520,737, filed on Nov. 8, 2021, now Pat. No. 11,902,156, which is a (Continued)

(30) Foreign Application Priority Data

May 9, 2019   (CN) .......................... 201910385660.9

(51) Int. Cl.
*H04L 45/00*    (2022.01)
*H04L 45/12*    (2022.01)
*H04L 45/42*    (2022.01)

(52) U.S. Cl.
CPC .......... *H04L 45/566* (2013.01); *H04L 45/123* (2013.01); *H04L 45/42* (2013.01)

(58) Field of Classification Search
CPC ..... H04L 45/566; H04L 45/123; H04L 45/42; H04L 45/34; H04L 45/74
See application file for complete search history.

(56) References Cited

U.S. PATENT DOCUMENTS

| | | |
|---|---|---|
| 9,083,708 B2 | 7/2015 | Ramjee et al. |
| 11,245,617 B1 | 2/2022 | Bonica |

(Continued)

FOREIGN PATENT DOCUMENTS

| | | |
|---|---|---|
| CN | 103825869 A | 5/2014 |
| CN | 105009476 A | 10/2015 |

(Continued)

OTHER PUBLICATIONS

R. Bonica et al, The IPV6 Segment Endpoint Option, draft-bonica-6man-seg-end-opt-00, Internet-Draft Feb. 27, 2019, total 7 pages.

(Continued)

*Primary Examiner* — Yaotang Wang

(57) ABSTRACT

This application discloses a method that includes obtaining by a network device an original segment list corresponding to a packet forwarding path, where the original segment list includes original segment identifiers that are sequentially arranged, and each of the original segment identifiers that are sequentially arranged corresponds to one node or link on the packet forwarding path. The method further includes comparing by the network device a plurality of successively adjacent original segment identifiers in the original segment list, to generate a plurality of successively adjacent compressed segment identifiers, where a length of each compressed segment identifier is less than a length of a corresponding original segment identifier, and generating by the network device a compressed segment list, where the com- (Continued)

---

S201: Obtain an original segment list corresponding to a packet forwarding path

S202: Compare S successively adjacent original segment identifiers in the original segment list to generate C successively adjacent compressed segment identifiers S203: Generate a compressed segment list to forward a packet along the packet forwarding path pressed segment list includes a plurality of compressed segment identifiers, and the compressed segment list is used to forward a packet along the packet forwarding path.

30 Claims, 6 Drawing Sheets

Related U.S. Application Data continuation of application No. PCT/CN2020/087804, filed on Apr. 29, 2020.

(56) References Cited

U.S. PATENT DOCUMENTS

| | | |
|---|---|---|
| 2014/0192809 A1 | 7/2014 | Park |
| 2014/0369356 A1 | 12/2014 | Bryant et al. |
| 2015/0263949 A1 | 9/2015 | Roch et al. |
| 2019/0081897 A1 | 3/2019 | Shakir et al. |

FOREIGN PATENT DOCUMENTS

| | | |
|---|---|---|
| CN | 105075194 A | 11/2015 |
| CN | 105471737 A | 4/2016 |
| CN | 107566272 A | 1/2018 |
| CN | 108429685 A | 8/2018 |
| CN | 109067652 A | 12/2018 |
| JP | 2014209764 A | 11/2014 |
| KR | 20090079386 A | 7/2009 |
| WO | 2019011114 A1 | 1/2019 |

OTHER PUBLICATIONS

Previdi S. et al: "IPv6 Segment Routing Header (SRH)", Mar. 28, 2018 (Mar. 28, 2018), pp. 1-23, XP055917738, total:23pages.

C. Filsfils, Ed. et al.," IPV6 Segment Routing Header (SRH) draft-ietf-6man-segment-routing-header-15", Oct. 22, 2018,total:32pages.

Qingpu Han et al, "Research of Wireless Sensor Networks Access Technology Fusing of I Pv6",Apr. 2013,76pages.

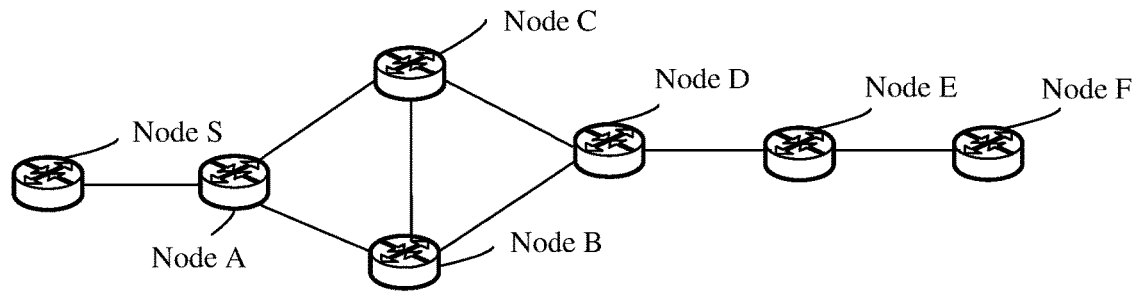
FIG. 1A
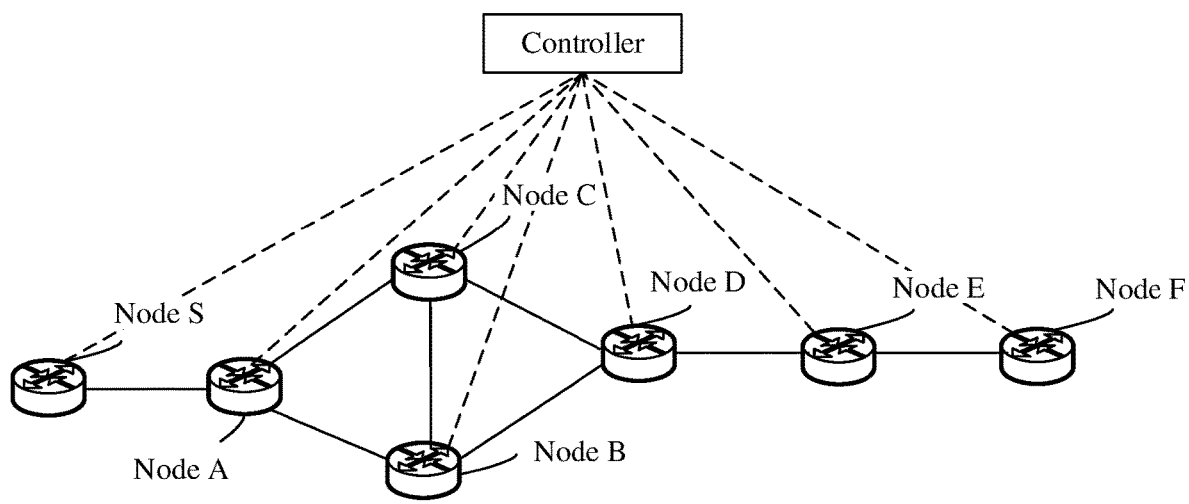
FIG. 1B
S201: Obtain an original segment list corresponding to a packet forwarding path
S202: Compare S successively adjacent original segment identifiers in the original segment list to generate C successively adjacent compressed segment identifiers
S203: Generate a compressed segment list to forward a packet along the packet forwarding path
FIG. 2

METHOD FOR GENERATING SEGMENT LIST, METHOD FOR FORWARDING PACKET, DEVICE, AND SYSTEM IN SRV6 NETWORK

CROSS-REFERENCE TO RELATED APPLICATIONS

This application is a continuation of U.S. patent application Ser. No. 17/520,737, filed on Nov. 8, 2021, which is a continuation of International Application No. PCT/CN2020/087804, filed on Apr. 29, 2020, which claims priority to Chinese Patent Application No. 201910385660.9, filed on May 9, 2019. All of the aforementioned applications are hereby incorporated by reference in their entireties.

TECHNICAL FIELD

This application relates to the communications field, and in particular, to a method for generating a segment list, a method for forwarding a packet, a device, and a system in an SRv6 network.

BACKGROUND

Segment routing (segment routing, SR) is a protocol designed based on a source routing concept to forward a data packet on a network, and supports explicit specifying a forwarding path of a data packet on a source node. When the SR is deployed on an Internet Protocol Version 6 (Internet Protocol Version 6, IPv6) data plane, it is referred to as segment routing over IPv6 (SRv6). SRv6 has a segment routing header (SRH) added compared to IPv6.

The SRH includes a segment list (SID list), the SID list includes a plurality of segment identifiers (segment identification, SID) that are sequentially arranged, and each SID corresponds to a node on a packet forwarding path. Each SID is a 128-bit (bit) IPv6 address. Each SID occupies 128 bits in a packet. Therefore, each time a SID is added to the SID list, the SRH is extended by 128 bits in length, and the packet is also extended by 128 bits in length. An increased length of the packet requires a large quantity of network resources such as bandwidth in a forwarding process. For example, when the packet forwarding path includes 100 nodes, the SRH needs to include 100 SIDs, and a length of the segment list is up to 1600 bytes. In this case, packet transmission efficiency in an SR network is reduced due to the lengthy segment list. In addition, the lengthy SRH makes packet processing more difficult. For example, a length of a packet window read by the node at one time is 128 bytes, while a length of the SRH is 1600 bytes, far greater than a length of the packet window read at one time. An entire SRH reading process is completed after a plurality of read operations, thereby reducing packet processing efficiency.

SUMMARY

This application provides a method for generating a segment list, a device, and a system, to resolve a technical problem that network transmission efficiency and processing efficiency are reduced due to a lengthy segment list.

According to a first aspect, a method for generating a segment list is provided. The method includes: A network device obtains an original segment list corresponding to a packet forwarding path, where the original segment list includes original segment identifiers that are sequentially arranged, and each original segment identifier in the original segment identifiers that are sequentially arranged corresponds to one node or link on the packet forwarding path. The network device compares S successively adjacent original segment identifiers in the original segment list, to generate C successively adjacent compressed segment identifiers, where the C compressed segment identifiers are in a one-to-one correspondence with C original segment identifiers in the S original segment identifiers, a sequence of the C compressed segment identifiers is the same as a sequence of the C original segment identifiers, and a length of each of the C compressed segment identifiers is less than a length of a corresponding original segment identifier. S is a positive integer, C is a positive integer, and C is less than or equal to S. The network device generates a compressed segment list, where the compressed segment list includes the C successively adjacent compressed segment identifiers, and the compressed segment list is used to forward a packet along the packet forwarding path.

In the method, the compressed segment identifier is generated based on the original segment identifier, where the length of the compressed segment identifier is less than that of the original segment identifier, a plurality of compressed segment identifiers are included in the compressed segment list, and a length of the compressed segment list is less than that of the original segment list. This improves packet transmission efficiency and processing efficiency in an SR network.

In a possible design, that the network device compares the S successively adjacent original segment identifiers in the original segment list, to generate the C successively adjacent compressed segment identifiers includes: The network device generates a difference set, where the difference set includes a difference between each original segment identifier other than the first original segment identifier in the S original segment identifiers and a previous original segment identifier. The network device obtains, based on the difference between each original segment identifier and the previous original segment identifier, a compressed segment identifier corresponding to each original segment identifier.

In a possible design, that the network device obtains, based on the difference between each original segment identifier and the previous original segment identifier, the compressed segment identifier corresponding to each original segment identifier includes: The network device calculates a largest length in lengths of the differences, where the largest length is L bytes, and L is a positive integer. The network device uses each of the differences as the compressed segment identifier corresponding to each original segment identifier other than the first original segment identifier, where a length of the compressed segment identifier corresponding to each original segment identifier other than the first original segment identifier is L bytes.

In a possible design, the method further includes: The network device generates the first compressed segment identifier, where the first compressed segment identifier is 0, a length of the first compressed segment identifier is the L bytes, and the first compressed segment identifier corresponds to the first original segment identifier.

In a possible design, the network device is a controller in a network, and the method further includes: The network device generates a first control packet, where the first control packet includes the compressed segment list and a first flag, and the first flag is used to indicate that a length of each compressed segment identifier in the compressed segment list is the L bytes. The network device sends the first control packet to a network ingress node.

In a possible design, the network device is a network ingress node. That the network device obtains the original segment list corresponding to the packet forwarding path includes: The network device receives the original segment list from a controller in a network. The method further includes: The network device receives a packet, where the packet is forwarded along the packet forwarding path. The network device encapsulates a first flag and the compressed segment list into the packet, where the first flag is used to indicate that a length of each compressed segment identifier in the compressed segment list is the L bytes.

In a possible design, a length of each of the S original segment identifiers is M bytes. That the network device compares S successively adjacent original segment identifiers in the original segment list, to generate C successively adjacent compressed segment identifiers includes: The network device compares the S original segment identifiers, and determines that first N bytes in the S original segment identifiers are the same. The network device uses last M−N bytes in each of the S original segment identifiers as a compressed segment identifier corresponding to each original segment identifier, where M is a positive integer, N is a positive integer, and N is less than M.

In a possible design, the network device is a controller in a network, and the method further includes: The network device generates a second control packet, where the second control packet includes the compressed segment list and a second flag, and the second flag is used to indicate that the compressed segment list includes the compressed segment identifier. The network device generates a fourth control packet corresponding to the compressed segment list, where the fourth control packet includes a fourth flag, and the fourth flag is used to indicate that the first N bytes in the S original segment identifiers are the same. The network device sends the second control packet to a network ingress node. The network device sends the fourth control packet to a node on the packet forwarding path.

In a possible design, each of the S original segment identifiers includes a first part, the first part includes a locator field and a function field, and a length of the first part is M bytes. That the network device compares the S successively adjacent original segment identifiers in the original segment list, to generate the C successively adjacent compressed segment identifiers includes: The network device compares the S original segment identifiers, and determines that first N bytes in the first parts of the S original segment identifiers are the same. The network device uses last M−N bytes in the first part of each original segment identifier as a compressed segment identifier corresponding to each original segment identifier, where M is a positive integer, N is a positive integer, and N is less than M.

In a possible design, the network device is a controller in a network, and the method further includes: The network device generates a first control packet, where the first control packet includes the compressed segment list and a first flag, and the first flag is used to indicate a length of each compressed segment identifier in the compressed segment list. The network device sends the first control packet to a network ingress node.

In a possible design, the network device generates a second control packet, where the second control packet includes the compressed segment list and a second flag, and the second flag is used to indicate that the compressed segment list includes the compressed segment identifier. The network device generates a fourth control packet corresponding to the compressed segment list, where the fourth control packet includes a fourth flag, and the fourth flag is used to indicate a length of each compressed segment identifier in the compressed segment list. The network device sends the second control packet to a network ingress node; and the network device sends the fourth control packet to a node on the packet forwarding path.

In a possible design, the network device is a network ingress node. That the network device obtains the original segment list corresponding to the packet forwarding path includes: The network device receives the original segment list from a controller in a network. The method further includes: The network device receives a packet, where the packet is forwarded along the packet forwarding path. The network device encapsulates a first flag and the compressed segment list into the packet, where the first flag is used to indicate a length of each compressed segment identifier in the compressed segment list.

In a possible design, the network device is a network ingress node. That the network device obtains the original segment list corresponding to the packet forwarding path includes: The network device receives the original segment list from a controller in a network. The method further includes: The network device encapsulates a second flag and the compressed segment list into the packet, where the second flag is used to indicate that the compressed segment list includes the compressed segment identifier.

In a possible design, each of the S original segment identifiers further includes a first part, and the second part includes an argument field.

In a possible design, each original segment identifier includes a first part and a second part. That the network device compares the S successively adjacent original segment identifiers in the original segment list, to generate the C successively adjacent compressed segment identifiers includes: The network device compares the first parts of the S original segment identifiers, to generate a first part of a compressed segment identifier corresponding to each of the S original segment identifiers, where a length of the first part of the compressed segment identifier is less than a length of the first part of the corresponding original segment identifier. The network device establishes a correspondence between the second part of each original segment identifier and a compression flag, and uses the compression flag as a second part of the compressed segment identifier corresponding to each original segment identifier, where a length of the second part of the compressed segment identifier is less than a length of the second part of the corresponding original segment identifier. The network device obtains, based on the first part of the compressed segment identifier corresponding to each original segment identifier and the second part of the compressed segment identifier corresponding to each original segment identifier, the compressed segment identifier corresponding to each original segment identifier.

In a possible design, that the network device compares the first parts of the S original segment identifiers, to generate the first part of the compressed segment identifier corresponding to each of the S original segment identifiers includes: The network device compares the first parts of the S original segment identifiers, and determines that first N bytes in the first parts of the S original segment identifiers are the same, where N is a positive integer. The network device uses last LA−N bytes in the first part of each original segment identifier as the first part of the compressed segment identifier corresponding to each original segment identifier, where LA is a positive integer, and a length of the first part of each of the S original segment identifiers is LA bytes.

In a possible design, the network device is a controller in a network. The method further includes: The network device generates a second control packet, where the second control packet includes the compressed segment list and a second flag, and the second flag is used to indicate that the compressed segment list includes the compressed segment identifier. The network device generates a fourth control packet corresponding to the compressed segment list, where the fourth control packet includes a fourth flag, and the fourth flag is used to indicate that the first N bytes in the first parts of the S original segment identifiers are the same. The network device sends the second control packet to a network ingress node; and the network device sends the fourth control packet to a node on the packet forwarding path.

In a possible design, the network device is a controller in a network, the S original segment identifiers do not include the last original segment identifier in the original segment list, and the compressed segment identifier includes the last original segment identifier. The method further includes: The network device generates a third control packet corresponding to the compressed segment list, where the third control packet includes a third flag, and the third flag is used to indicate that the compressed segment list includes the last original segment identifier. The network device sends the third control packet to the network ingress node.

In a possible design, the network device is a network ingress node. That the network device obtains the original segment list corresponding to the packet forwarding path includes: The network device receives the original segment list from a controller in a network. The method further includes: The network device generates a second flag corresponding to the compressed segment list, where the second flag is used to indicate that the compressed segment list includes the compressed segment identifier. The network device receives a packet, where the packet is forwarded along the packet forwarding path. The network device encapsulates the second flag and the compressed segment list into the packet.

In a possible design, the network device is a controller in a network, the S segment identifiers do not include the last original segment identifier in the original segment list, and the compressed segment identifier includes the last original segment identifier. The method further includes: The network device generates a third flag corresponding to the compressed segment list, where the third flag is used to indicate that the compressed segment list includes the last original segment identifier. The network device encapsulates the third flag into the packet.

In a possible design, the length of the compressed segment identifier is 32 bits or 4 bytes.

According to a second aspect, a method for forwarding a packet is provided. The method includes: A network device receives a packet, where the packet includes a compressed segment list, the compressed segment list corresponds to a forwarding path of the packet, and the compressed segment list includes a compressed segment identifier. The network device generates an original segment identifier based on the compressed segment identifier and a destination address of the packet, where the original segment identifier corresponds to a next-hop node of the network device on the forwarding path of the packet, and a length of the compressed segment identifier is less than a length of the original segment identifier. The network device sends the packet to the next-hop node based on the original segment identifier.

In the method, the original segment identifier is generated based on the compressed segment identifier, where the length of the compressed segment identifier is less than that of the original segment identifier, and a length of the compressed segment list is less than that of the original segment list. This improves packet transmission efficiency in an SR network. The original segment identifier is used to forward a packet, and therefore a forwarding feature of an SRv6 network is not affected.

In a possible design, that the network device generates the original segment identifier based on the compressed segment identifier and the destination address of the packet includes: The network device adds the compressed segment identifier and the destination address of the packet to generate the original segment identifier.

In a possible design, that the network device generates the original segment identifier based on the compressed segment identifier and the destination address of the packet includes: The network device replaces last X bytes in the destination address of the packet with the compressed segment identifier, where X is a positive integer, and the length of the compressed segment identifier is X bytes.

In a possible design, that the network device generates the original segment identifier based on the compressed segment identifier and the destination address of the packet includes: The network device replaces a to-be-replaced part in the destination address of the packet with the compressed segment identifier, where a length of the to-be-replaced part is the same as the length of the compressed segment identifier.

In a possible design, that the network device generates the original segment identifier based on the compressed segment identifier and the destination address of the packet includes: The network device divides the compressed segment identifier into a first part and a second part. The network device replaces last Y bytes in the first part of the destination address of the packet with the first part of the compressed segment identifier, to obtain a first part of the original segment identifier, where Y is a positive integer, and a length of the first part of the compressed segment identifier is Y bytes. The network device obtains a second part of the original segment identifier based on a correspondence between the second part of the compressed segment identifier and the second part of the original segment identifier. The network device obtains the original segment identifier based on the first part of the original segment identifier and the second part of the original segment identifier.

In a possible design, the packet includes a first flag, the first flag is used to indicate that the length of the compressed segment identifier is X bytes, and X is a positive integer. The method further includes: The network device reads the compressed segment identifier from the compressed segment list based on an indication of the first flag.

In a possible design, the packet includes a second flag, and the second flag is used to indicate that the compressed segment list includes the compressed segment identifier. The method further includes: The network device receives a fourth control packet from a controller in a network, where the fourth control packet includes a fourth flag, a value of the fourth flag is N, and N is a positive integer. The network device reads the compressed segment identifier from the compressed segment list based on an indication of the second flag, where the length of the compressed segment identifier is M−N bytes, M is a positive integer, M is greater than N, and the length of the original segment identifier is M bytes.

In a possible design, the packet includes a first flag, the first flag is used to indicate that the length of the compressed segment identifier is X bytes, X is a positive integer, the packet includes a second flag, and the second flag is used to indicate that the compressed segment list includes the compressed segment identifier. The method further includes: The network device receives a fourth control packet from a controller in a network, where the fourth control packet includes a fourth flag, a value of the fourth flag is N, and N is a positive integer. The network device reads the compressed segment identifier from the compressed segment list based on an indication of the second flag, where the length of the compressed segment identifier is the X bytes. The network device obtains the first part of the compressed segment identifier and the second part of the compressed segment identifier from the compressed identifier based on an indication of the fourth flag, where a length of the first part of the compressed segment identifier is X−M+N bytes, M is a positive integer greater than N, and a length of the first part of the original segment identifier is M bytes.

In a possible design, the packet includes a second flag, and the second flag is used to indicate that the compressed segment list includes the compressed segment identifier. The method further includes: The network device receives a fourth control packet from a controller in a network, where the fourth control packet includes a fourth flag, and the fourth flag is used to indicate the length of the compressed segment identifier. The network device reads the compressed segment identifier from the compressed segment list based on the second flag and the fourth flag.

In a possible design, a destination address field of the packet includes a current segment identifier, and the current segment identifier is used to indicate the length of the compressed segment identifier. The method further includes: The network device reads the compressed segment identifier from the compressed segment list based on the length of the compressed segment identifier indicated by the current segment identifier.

In a possible design, the original segment identifier is a binding segment identifier, and the binding segment identifier is used to indicate the next-hop node to send a packet including the binding segment identifier to a node corresponding to the binding segment identifier.

In a possible design, the method further includes: The network device replaces an address in the destination address field in a packet header of the packet with the original segment identifier.

According to a third aspect, a network device is provided, and performs the method performed by the network device in any one of the first aspect or the possible implementations of the first aspect. Specifically, the network device includes units configured to perform the method in any one of the first aspect or the possible implementations of the first aspect.

According to a fourth aspect, a network device is provided, and performs the method performed by the network device in any one of the second aspect or the possible implementations of the second aspect. Specifically, the network device includes units configured to perform the method in any one of the second aspect or the possible implementations of the second aspect.

According to a fifth aspect, a network device is provided, where the network device includes a processor, a network interface, and a memory. The network interface may be a transceiver. The memory may be configured to store program code, and the processor is configured to invoke the program code in the memory to perform the method in any one of the first aspect or the possible implementations of the first aspect. Details are not described herein again.

According to a sixth aspect, a network device is provided, where the network device includes a processor, a network interface, and a memory. The network interface may be a transceiver. The memory may be configured to store program code, and the processor is configured to invoke the program code in the memory to perform the method in any one of the second aspect or the possible implementations of the second aspect. Details are not described herein again.

According to a seventh aspect, a network system is provided, where the system includes a controller, a first network device, and a second network device.

The controller is configured to: obtain an original segment list corresponding to a packet forwarding path, where the original segment list includes original segment identifiers that are sequentially arranged, and each original segment identifier in the original segment identifiers that are sequentially arranged corresponds to one network device on the packet forwarding path; compare S successively adjacent original segment identifiers in the original segment list, to generate C successively adjacent compressed segment identifiers, where the C compressed segment identifiers are in a one-to-one correspondence with C original segment identifiers in the S original segment identifiers, a sequence of the C compressed segment identifiers is the same as a sequence of the C original segment identifiers, and a length of each of the C compressed segment identifiers is less than a length of a corresponding original segment identifier, where S is a positive integer, C is a positive integer, and C is less than or equal to S; and generate a compressed segment list, where the compressed segment list includes the C successively adjacent compressed segment identifiers, and the compressed segment list is used to forward a packet along the packet forwarding path.

The first network device is configured to: receive the compressed segment list from the controller; receive a packet, where the packet is forwarded along the packet forwarding path; and encapsulate the compressed segment list into the packet, and send the packet to the second network device.

The second network device is configured to: receive the packet sent by the first network device; generate, based on the compressed segment identifier and a destination address of the packet, an original segment identifier corresponding to the compressed segment identifier, where the original segment identifier corresponds to a next-hop node of the second network device on the forwarding path of the packet, and a length of the compressed segment identifier is less than a length of the original segment identifier; and send the packet to the next-hop node based on the original segment identifier.

According to an eighth aspect, a computer storage medium is provided, and used to store computer software instructions used by the foregoing network device, where the instructions include a program used to execute the foregoing aspects.

According to a ninth aspect, a computer program product including computer program instructions is provided. When the computer program product runs on a network device, the network device is enabled to perform the method provided in any one of the first aspect, the second aspect, the tenth aspect, the possible implementations of the first aspect, the possible implementations of the second aspect, or the possible implementations of the tenth aspect.

According to a tenth aspect, a method for forwarding a packet is provided. The method includes: A network device obtains a compressed segment list including a compressed segment identifier, where each compressed segment identifier in the compressed segment identifier corresponds to one node or link on a packet forwarding path. The network device receives a first packet, where the first packet is forwarded along the packet forwarding path. The network device encapsulates the compressed segment list into the first packet, to form a second packet. The network device sends the second packet along the packet forwarding path.

The method may be performed by a network ingress device, and encapsulates the compressed segment list including the compressed segment identifier into a packet, where the compressed segment list is used to indicate to forward the packet along the forwarding path. A length of the compressed segment identifier is less than that of an original segment identifier, and a length of the compressed segment list is less than that of the original segment list. This improves packet transmission efficiency in an SR network.

In a possible design, the second packet includes a first flag, and the first flag is used to indicate a length of each compressed segment identifier in the compressed segment list.

In a possible design, the second packet includes a second flag, and the second flag is used to indicate that the compressed segment list includes the compressed segment identifier.

According to an eleventh aspect, a network device is provided, and performs the method performed by the network device in any one of the tenth aspect or the possible implementations of the tenth aspect. Specifically, the network device includes units configured to perform the method in any one of the tenth aspect or the possible implementations of the tenth aspect.

According to a twelfth aspect, a network device is provided, where the network device includes a processor, a network interface, and a memory. The network interface may be a transceiver. The memory may be configured to store program code, and the processor is configured to invoke the program code in the memory to perform any one of the tenth aspect or the possible implementations of the tenth aspect. Details are not described herein again.

BRIEF DESCRIPTION OF DRAWINGS

FIG. 1A is a schematic diagram of a network scenario according to an embodiment of the present disclosure;

FIG. 1B is a schematic diagram of another network scenario according to an embodiment of the present disclosure;

FIG. 2 is a method for generating a segment list according to an embodiment of the present disclosure;

DESCRIPTION OF EMBODIMENTS

Figure 3A:
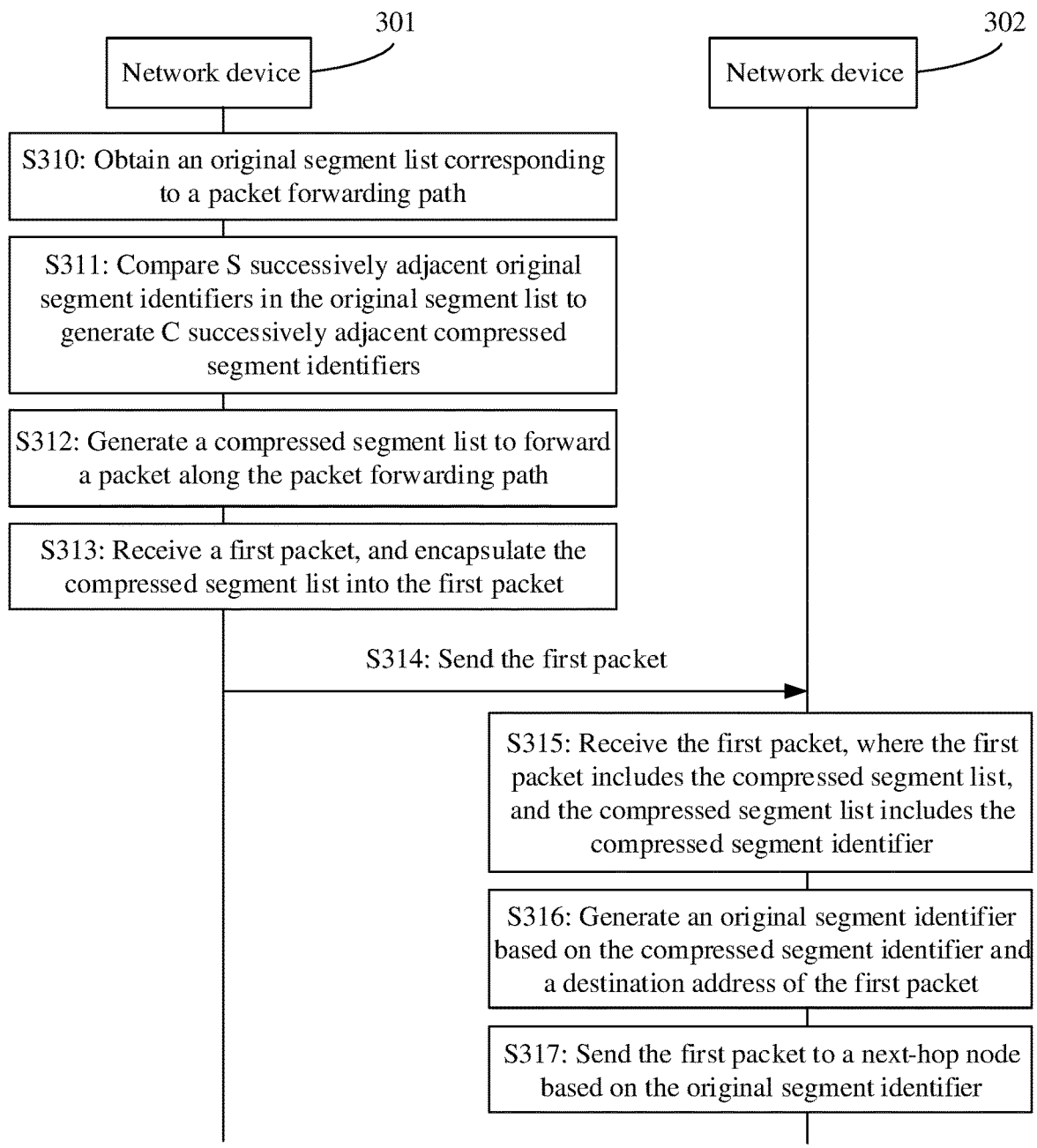
FIG. 3A is a method for generating a segment list according to an embodiment of the present disclosure.

The following describes embodiments of this application with reference to the accompanying drawings.

FIG. 1A shows a possible application scenario according to an embodiment of this application. This scenario includes an SRv6 network. The SRv6 network includes several nodes, for example, a node S, a node A, a node B, a node C, a node D, a node E, and a node F. These nodes may be network devices, network elements (network elements), or the like in the network, for example, switches, routers, or forwarders. The node S may be an ingress node in the network. FIG. 1B shows another possible application scenario according to an embodiment of this application. This scenario also includes an SRv6 network, and the SRv6 network further includes a controller in addition to the foregoing nodes. The controller may generate a segment routing policy (SR policy) including a segment list, and send the SR policy to a network ingress node. The controller may send a control packet including network configuration information to another node in the network. Each node has a corresponding SID. The SID of each node may include a locator (locator) part and a function (function) part, which may also be referred to as a locator field and a function field. The locator part is used to indicate an address of a node. To be specific, the SRv6 network forwards a packet to the node based on the locator part in the SID. The function part is used to indicate an operation performed by the node. Because the locator part is used to indicate the address of a node, locator parts of nodes in a same network segment share same content. In addition, although a total length of the locator part and the function part is fixed and equal to a length of the entire SID, respective lengths of the locator part and the function part are not fixed. For example, in the application scenarios shown in FIG. 1A and FIG. 1B, a SID of the node A is AAAA:BBBB:CCCC:DDDD:EEEE:FFFF:1AAA:BBB1, a SID of the node B is AAAA:BBBB:CCCC:DDDD:EEEE:FFFF:2AAA:BBB2, a SID of the node C is AAAA:BBBB:CCCC:DDDD:EEEE:FFFF:3AAA:BBB3, a SID of the node D is AAAA:BBBB:CCCC:DDDD:EEEE:FFFF:4AAA:BBB4, a SID of the node E is AAAA:BBBB:CCCC:DDDD:EEEE:FFFF:5AAA:BBB5, and a SID of the node F is AAAA:BBBB:CCCC:DDDD:EEEE:FFFF:6AAA:BBB6. A length of each character may be 4 bits, and each SID is 128 bits, that is, 16 bytes (bytes). First 13 bytes of each SID may be a locator part, and last 3 bytes may be a function ID part. For example, the SID of the node A is AAAA:BBBB:CCCC:DDDD:EEEE:FFFF:1AAA:BBB1, where lengths of the character A, the character B, the character C, the character D, the character E, the character F, and the character 1 are all 4 bits, and a total length of the SID is 16 bytes. The first 13 bytes AAAA:BBBB:CCCC:DDDD:EEEE:FFFF:1A are the locator part, and the last three bytes AA:BBB1 are the function part. The foregoing six nodes are located in a same network segment, and locator parts of SIDs of the six nodes share a same part of the content. Specifically, first 12 bytes of the SIDs of the six nodes are the same.

In the application scenarios shown in FIG. 1A and FIG. 1B, the node S is the network ingress node. The node S may be connected to a user node (which is not shown in the figure), and receive a packet sent by the user node. When sending a packet to the SRv6 network, the user node first sends a request including a destination address of the packet to the controller. The controller generates, based on the request of the user node, a packet forwarding path associated with the destination address, and sends a segment list corresponding to the packet forwarding path to the node S. After receiving the packet sent by the user node, the node S encapsulates the segment list into the packet, and indicates to forward the packet along the packet forwarding path. The segment list includes segment identifiers of one or more nodes on the packet forwarding path. For example, when the packet forwarding path successively passes through the node A, the node B, the node C, the node E, and the node F, the segment list is [AAAA:BBBB:CCCC:DDDD:EEEE:FFFF:1AAA:BBB1, AAAA:BBBB:CCCC:DDDD:EEEE:FFFF:2AAA:BBB2, AAAA:BBBB:CCCC:DDDD:EEEE:FFFF:3AAA:BBB3, AAAA:BBBB:CCCC:DDDD:EEEE:FFFF:4AAA:BBB4, AAAA:BBBB:CCCC:DDDD:EEEE:FFFF:5AAA:BBB5, AAAA:BBBB:CCCC:DDDD:EEEE:FFFF:6AAA:BBB6]. It can be learned that the entire SID list includes six SIDs, and a length of the entire SID list is 96 bytes. This reduces network transmission efficiency and processing efficiency.

Embodiments of this application provide a method for generating a segment list, and a device and system based on the method. The method, the device, and the system are based on a same inventive concept. Principles of resolving problems by the method, the device, and the system are similar. Therefore, mutual reference may be made to the embodiments of the method, the device, and the system, and same or similar content is not described herein.

Refer to FIG. 2. An embodiment of the present disclosure provides a method for generating a segment list. The method includes the following steps.

S201: A network device obtains an original segment list corresponding to a packet forwarding path. The original segment list includes original segment identifiers that are sequentially arranged, and each original segment identifier in the original segment identifiers that are sequentially arranged corresponds to one node or link on the packet forwarding path.

The original segment identifier may be a node segment identifier (node SID) corresponding to a node in an SRv6 network, or the original segment identifier may be an adjacency segment identifier (adjacent SID) corresponding to a link of the node. For example, an original segment identifier of the node A in FIG. 1 is a SID corresponding to the node A, that is, AAAA:BBBB:CCCC:DDDD:EEEE:FFFF:1AAA:BBB1. The original segment list may be formed by sequentially arranging SIDs corresponding to network devices on the packet forwarding path. Therefore, the original segment identifiers that are sequentially arranged in the original segment list correspond to the network device that the packet forwarding path successively passes through.

In an example, the network device may be an ingress node in the network. With reference to the application scenarios shown in FIG. 1A and FIG. 1B, the network device may be the node S. That the node S obtains the original segment list may mean that the node S receives the original segment list from a controller.

In an example, the network device may be a controller in the network. With reference to the application scenario shown in FIG. 1B, the network device may be the controller in FIG. 1B. The controller generates, based on a request of a user node, the original segment list corresponding to the packet forwarding path.

S202: The network device compares S successively adjacent original segment identifiers in the original segment list to generate C successively adjacent compressed segment identifiers. The C compressed segment identifiers are in a one-to-one correspondence with C original segment identifiers in the S original segment identifiers, a sequence of the C compressed segment identifiers is the same as a sequence of the C original segment identifiers, and a length of each of the C compressed segment identifiers is less than a length of a corresponding original segment identifier. S is a positive integer, C is a positive integer, and C is less than or equal to S.

The S original segment identifiers may be all original segment identifiers in the original segment list. The S original segment identifiers may alternatively be some original segment identifiers selected from the original segment list.

In an example, the network device compares the S original segment identifiers, and compresses the original segment identifiers by obtaining a difference. With reference to the application scenarios shown in FIG. 1A and FIG. 1B, for example, the network device may compare all six SIDs in the original segment list. In this case, S is equal to 6.

The network device separately obtains a difference between each original segment identifier other than the first original segment identifier in the S original segment identifiers and a previous original segment identifier. The first original segment identifier may be the first SID in the original segment list, that is, a SID corresponding to a next-hop node of the network ingress node on the packet forwarding path. With reference to the application scenarios shown in FIG. 1A and FIG. 1B, the first original segment identifier may be the SID corresponding to the node A. The difference may be a difference obtained by using each original segment identifier as a minuend and using the previous original segment identifier as a subtrahend. Alternatively, the difference may be a difference obtained by using each segment identifier as a subtrahend and using the previous original segment identifier as a minuend. In addition, the difference is a signed number, and a most significant bit describes a sign of the difference. For example, when the most significant bit is 1, it indicates that a sign of the difference is negative; and when the most significant bit is 0, it indicates that a sign of the difference is positive. A length of the most significant bit may be 1 bit. For example, the network device separately calculates a difference between each of last five SIDs in the six SIDs and a respective previous SID. Specifically, a difference between the second SID (AAAA:BBBB:CCCC:DDDD:EEEE:FFFF:2AAA:BBB2) and the first SID (AAAA:BBBB:CCCC:DDDD:EEEE:FFFF:1AAA:BBB1) calculated by the network device is 0:1000:0001. The most significant bit 0 indicates that the difference is positive, and a length of the most significant bit is 1 bit. 32 bits following the most significant bit are 1000:0001, where lengths of the character 1 and the character 0 are all 4 bits. Therefore, a total length of the difference is 33 bits. The difference corresponds to the second SID, and may be denoted as the second difference. Similarly, a difference between the third SID (AAAA:BBBB:CCCC:DDDD:EEEE:FFFF:3AAA:BBB3) and the second SID obtained by the network device is 0:1000:0001, a difference between the fourth SID (AAAA:BBBB:CCCC:DDDD:EEEE:FFFF:4AAA:BBB4) and the third SID obtained by the network device the fifth SID is 0:1000:0001, a difference between (AAAA:BBBB:CCCC:DDDD:EEEE:FFFF:5AAA:BBB5) and the fourth SID obtained by the network device is 0:1000:0001, and a difference between the sixth SID (AAAA:BBBB:CCCC:DDDD:EEEE:FFFF: 6AAA:BBB6) and the fifth SID obtained by the network device is 0:1000:0001. Four differences respectively correspond to the third SID, the fourth SID, the fifth SID, and the sixth SID, and may be respectively denoted as the third difference, the fourth difference, the fifth difference, and the sixth difference. It can be learned that the network device obtains five differences in total, and the five differences are arranged in an arrangement order of the five corresponding SIDs. In this case, C may be equal to 5.

Further, the network device obtains, based on the difference, a compressed segment identifier corresponding to each original segment identifier. Specifically, the network device sets a value of each of the differences to a value of a corresponding compressed segment identifier, calculates a largest length in lengths of the differences, and sets a length of the compressed segment identifier to the largest length, to obtain each compressed segment identifier. For example, the network device separately sets values of the five differences to values of corresponding compressed segment identifiers, and obtains through calculation that lengths of the five differences are all 33 bits. In other words, the largest length is 33 bits. Optionally, a length of the compressed segment identifier is 8-bit aligned, and therefore a length of each compressed segment identifier is bytes. Specifically, a value of a compressed segment identifier corresponding to the second difference is 0:1000:0001, and a length of the compressed segment identifier is 5 bytes. Therefore, the network device obtains five compressed segment identifiers corresponding to the five SIDs. The five compressed segment identifiers are also arranged in the arrangement order of the five corresponding SIDs. Lengths of the five compressed segment identifiers are all 5 bytes, which are less than 16 bytes of the original segment identifier.

In an example, the network device may further generate a compressed segment identifier corresponding to the first SID. Specifically, the network device obtains a difference between the first SID and the first SID, where the difference is 0. The network device sequentially arranges the difference and the five differences. In this case, C may be equal to 6. The network device uses 0 as a value of the compressed segment identifier corresponding to the first SID, and sets a length of the compressed segment identifier corresponding to the first SID to be the same as a length of the five compressed segment identifiers, that is, five bytes. In this way, the compressed segment identifier corresponding to the first SID is obtained. The network device places the compressed segment identifier corresponding to the first SID before the five compressed segment identifiers, so that six compressed segment identifiers in total are arranged in an arrangement order of the six corresponding SIDs. Lengths of the six compressed segment identifiers are all 5 bytes, which are less than 16 bytes of the original segment identifier.

In an example, the network device compares the S original segment identifiers, and compresses the original segment identifiers by obtaining a different part. For example, the network device determines, by comparing the six SIDs, that first 12 bytes of the SIDs are the same, that is, AAAA: BBBB:CCCC:DDDD:EEEE:FFFF. The network device selects last four bytes of each SID as a compressed segment identifier corresponding to each SID. For example, last four bytes of the SID corresponding to the node A are 1AAA: BBB1, so that a compressed segment identifier corresponding to the SID is 1AAA:BBB1. Similarly, compressed segment identifiers corresponding to SIDs of the node B, the node C, the node E, and the node F are respectively 2AAA:BBB2, 3AAA:BBB3, 4AAA:BBB4, and 5AAA: BBB5. 6AAA:BBB6. In other words, the network device generates the six compressed segment identifiers that are in a one-to-one correspondence with the six SIDs, and the six compressed segment identifiers are successively adjacent. In this case, C is equal to 6. Lengths of the six compressed segment identifiers are all 4 bytes, which are less than 16 bytes of the original segment identifier.

With reference to the foregoing description, the SID of each node may include a first part. The first part includes a locator (locator) field and a function (function) field, where the locator field is used to indicate an address of a node, and the function field is used to indicate an operation performed by the node. In some scenarios, the SID of each node may further include a second part. The second part is an argument (argument) field, and is used to indicate an argument used when the node performs the operation corresponding to the function field. In an SID, the argument field usually follows the function field. For example, in the SID of each node, a length of the locator field may be 64 bits, a length of the function field may be 16 bits, and a length of the argument field may be 48 bits. In other words, in the SID, first 64 bits are the locator field, middle 16 bits are the function field, and last 48 bits are the argument field.

In an example, when the network device compares the S original segment identifiers, and compresses the original segment identifier by obtaining a different part, the network device may compare only first parts including locator fields and function fields in the S original segment identifiers rather than compare second parts including argument fields in the S original segment identifiers. Therefore, the length of the compressed segment identifier may be further shortened. For example, when the length of the locator field in the SID is 64 bits, the length of the function field is 16 bits, and the length of the argument field is 48 bits, the network device may compare only first 80 bits including the locator field and the argument field, to compress the original segment identifier by obtaining a different part.

In an example, the network device separately processes the locator part and the function ID part of each of the S original segment identifiers. The network device compares locator parts of the original segment identifiers to obtain a different part of the locator part as a first part of a compressed segment identifier corresponding to each SID. The network device establishes a correspondence between a node operation indicated by the function ID part of each original segment identifier and one compressed function ID, and uses the compressed function ID as the second part of the compressed segment identifier corresponding to each SID. A length of the compressed function ID is less than a length of a function ID part of each original segment identifier. For example, first 13 bytes of each of the six SIDs are a locator part, and last 3 bytes are a function ID part. The network device compares locator parts of the six SIDs to determine that first 12 bytes of the locator parts in the SIDs are the same, that is, AAAA:BBBB:CCCC:DDDD:EEEE: FFFF. The network device selects a last byte of the locator part in each SID as the first part of the compressed segment identifier corresponding to each SID. For example, if a last byte of a locator part in the SID corresponding to the node A is 1A, a first part of a compressed segment identifier corresponding to the SID is 1A. Similarly, first parts of compressed segment identifiers corresponding to the SIDs of the node B, the node C, the node E, and the node F are respectively 2A, 3A, 4A, 5A, and 6A. A function ID part in the SID of the node A is AA:BBB1, and may indicate a node operation of replacing a DA field with a next SID and then forwarding a data packet after a table lookup. A function name is END SID. The network device establishes a correspondence between the node operation indicated by the function ID part in the SID of the node A and one compressed function ID. For example, the compressed function ID is B1. In other words, B1 is a compressed function ID corresponding to the node operation of forwarding a data packet after a table lookup (END SID). Similarly, node operations indicated by function ID parts in the SIDs of the node B, the node C, the node E, and the node F may also respectively correspond to compressed function IDs, and these compressed function IDs may be B2, B3, B4, B5, and B6. Further, second parts of the compressed segment identifiers corresponding to the SIDs of the node B, the node C, the node E, and the node F are respectively 2A, 3A, 4A, 5A, and 6A. Therefore, the network device generates six compressed segment identifiers that are in a one-to-one correspondence with the six SIDs, that is, 1AB1, 2AB2, 3AB3, 4AB4, 5AB5, and 6AB6 respectively. Lengths of the six compressed segment identifiers are all 2 bytes, which are less than 16 bytes of the original segment identifier.

Optionally, the network device publishes the correspondence between each compressed function ID and each node operation to each node on the packet forwarding path.

Optionally, the network device advertises the correspondence between each compressed function ID and the function ID part of each SID to each node on the packet forwarding path.

It can be learned that whether compression is performed by obtaining an overall difference of the SID, compression is performed by obtaining an overall different part of the SID, or compression is separately performed on two divided parts in the SID, a length of a finally obtained compressed segment identifier is less than a length of the SID (namely, the original segment identifier).

It can be further learned that, in the foregoing example, the length of the compressed segment identifier is determined by a specific difference or different part. For example, when compression is performed by obtaining the overall difference of the SID, the length of the compressed segment identifier is determined by the overall difference of the SID; when compression is performed by obtaining the overall different part of the SID, the length of the compressed segment identifier is determined by the overall different part of the SID; and when compression is separately performed on the two divided parts in the SID, the length of the compressed segment identifier is determined by differences or different parts of the two parts.

Optionally, the length of the compressed segment identifier may be expressed in bytes, or the length of the compressed segment identifier is per-byte aligned. For example, the length of the compressed segment identifier may be 2 bytes, 3 bytes, or 4 bytes, or the like. For example, when compression is performed by obtaining the overall different part of the SID, if a length of the overall different part of the SID is 33 bits, that is, a length of a same part between SIDs in the segment list is 95 bits, and a length of a different part is 33 bits, the length of the compressed segment identifier is 5 bytes.

Optionally, the length of the compressed segment identifier may be expressed in bits, or the length of the compressed segment identifier may be per-bit aligned. For example, the length of the compressed segment identifier may be 16 bits, 20 bits, 32 bits, or the like. For example, when compression is performed by obtaining the overall different part of the SID, if a length of the overall different part of the SID is 33 bits, that is, a length of a same part between SIDs in the segment list is 95 bits, and a length of a different part is 33 bits, the length of the compressed segment identifier is 33 bits.

S203: The network device generates a compressed segment list, where the compressed segment list includes the C successively adjacent compressed segment identifiers, and the compressed segment list is used to forward a packet along the packet forwarding path.

An example is provided with reference to the application scenarios shown in FIG. 1A and FIG. 1B. In an example, the network device compares the six SIDs in the original segment list to obtain different parts, and further obtains the six compressed segment identifiers:1AAA:BBB1, 2AAA:BBB2, 3AAA:BBB3, 4AAA:BBB4, 5AAA:BBB5, 6AAA:BBB6. In this case, C is equal to 6. The six compressed segment identifiers respectively correspond to the SIDs of the node A, the node B, the node C, the node E, and the node F. The network device generates the compressed segment list, that is, [1AAA:BBB1, 2AAA:BBB2, 3AAA:BBB3, 4AAA:BBB4, 5AAA:BBB5, 6AAA:BBB6].

In an example, the network device compares the six SIDs in the original segment list to obtain differences. Specifically, the network device separately obtains a difference between each of the last five SIDs in the foregoing six SIDs and a previous SID, and further obtains five compressed segment identifiers, that is, 0:1000:0001, 0:1000:0001, 0:1000:0001, 0:1000:0001, 0:1000:0001. In this case, C is equal to 5. The five compressed segment identifiers respectively correspond to the SIDs of the node B, the node C, the node E, and the node F. The network device generates the compressed segment list including the five compressed segment identifiers, that is, [0:1000:0001, 0:1000:0001, 0:1000:0001, 0:1000:0001, 0:1000:0001].

In some application scenarios, a value of a last SID in the SID list may differ greatly from a value of another SID. For example, when a node corresponding to the last SID and a node corresponding to a SID previous to the last SID belong to different domains in the network, or when the SID list is generated by using an insertion (insertion) mode, the value of the last SID in the SID list differs greatly from a value of another SID. In this case, in the foregoing manner of performing compression by obtaining a difference or performing compression by obtaining a different part, a compression effect is affected. With reference to the application scenarios shown in FIG. 1A and FIG. 1B, the packet forwarding path successively passes through the node A, the node B, the node C, the node E, and a node G (which is not shown in the figure), where a SID of the node G is a ABCD:ABCD:ABCD:ABCD:ABCD:ABCD:6AAA:BBB6. The original segment list is [AAAA:BBBB:CCCC:DDDD:EEEE:FFFF:1AAA:BBB1, AAAA:BBBB:CCCC:DDDD:EEEE:FFFF:2AAA:BBB2, AAAA:BBBB:CCCC:DDDD:EEEE:FFFF:3AAA:BBB3, AAAA:BBBB:CCCC:DDDD:EEEE:FFFF:4AAA:BBB4, AAAA:BBBB:CCCC:DDDD:EEEE:FFFF:5AAA:BBB5, ABCD:ABCD:ABCD:ABCD:ABCD:ABCD:6AAA:BBB6]. The network device may compare all the six SIDs, that is, S may be equal to 6. If compression is performed by obtaining a different part, the network device compares the six SIDs and finds that for all the six SIDs, only first bytes A are the same. In this case, according to the foregoing method, the length of the compressed segment identifier is 15 bytes, and a compression effect is not ideal. If compression is performed by obtaining a difference, a difference between the sixth SID (ABCD:ABCD:ABCD:ABCD:ABCD:ABCD:6AAA:BBB6) and the fifth SID (AAAA:BBBB:CCCC:DDDD:EEEE:FFFF:5AAA:BBB5) is 0123:0123:0123:0123:0123:0123:1000:

0001, which is 125 bits in total. In this case, according to the foregoing method, a length of an aligned compressed segment identifier is 16 bytes, and a compression effect is not ideal.

In an example, the network device does not compress the last SID in the original segment list. With reference to the application scenarios shown in FIG. 1A and FIG. 1B, the network device compares the first five SIDs in the original segment list. For example, compression is performed by obtaining a different part, and five compressed segment identifiers obtained by the network device are respectively 1AAA:BBB1, 2AAA:BBB2, 3AAA:BBB3, 4AAA:BBB4, and 5AAA:BBB5. In this case, C is equal to 5. The five compressed segment identifiers respectively correspond to the SIDs of the node A, the node B, the node C, and the node E. The network device generates the compressed segment list including the five compressed segment identifiers, that is, [1AAA:BBB1, 2AAA:BBB2, 3AAA:BBB3, 4AAA: BBB4, 5AAA:BBB5, ABCD:ABCD:ABCD: ABCD:ABCD:6AAA:BBB6]. The last segment ID is still the SID in the original segment list and is not compressed. Lengths of the first five compressed segment identifiers are all 4 bytes, a length of the last SID is 16 bytes, and a length of the compressed segment list is 36 bytes. Compared with a length of 96 bytes of the original segment list, the length of the compressed segment list is still shortened, thereby improving network transmission efficiency.

In an example, the network device maps the last SID by using a binding segment identifier (binding SID, BSID). An example is provided with reference to the application scenarios shown in FIG. 1A and FIG. 1B. In this case, the node F (which is not shown in the figure) advertises a binding SID AAAA:BBBB:CCCC:DDDD:EEEE:FFFF:6AAA: BBB6=ABCD:ABCD:ABCD:ABCD:ABCD:ABCD: 6AAA:BBB6 through network configuration, where AAAA: BBBB:CCCC:DDDD:EEEE:FFFF:6AAA:BBB6 is a binding SID corresponding to the node F. In this case, the original segment list obtained by the network device may be [AAAA:BBBB:CCCC:DDDD:EEEE:FFFF:1AAA:BBB1, AAAA:BBBB:CCCC:DDDD:EEEE:FFFF:2AAA:BBB1, AAAA:BBBB:CCCC:DDDD:EEEE:FFFF:3AAA:BBB1, AAAA:BBBB:CCCC:DDDD:EEEE:FFFF:4AAA:BBB1, AAAA:BBBB:CCCC:DDDD:EEEE:FFFF:5AAA:BBB1, AAAA:BBBB:CCCC:DDDD:EEEE:FFFF:6AAA:BBB2]. The last SID is the binding SID. For example, compression is performed by obtaining a different part, and the network device generates the compressed segment list, that is, [1AAA:BBB1, 2AAA:BBB2, 3AAA:BBB3, 4AAA:BBB4, 5AAA:BBB5. 6AAA:BBB6]. For a process of generating the compressed segment list, refer to the foregoing method. Details are not described herein again. The six compressed segment identifiers in the compressed segment list respectively correspond to the node A, the node B, the node C, the node E, and the node F. During forwarding of a packet according to the compressed segment list, after the packet arrives at the node F, the node F further sends the packet to the node G. In this case, the length of the compressed segment list is still shortened, thereby improving network transmission efficiency.

Refer to FIG. 3A. An embodiment of this application provides a method for generating a segment list. The method relates to a network device 301 and a network device 302. The network device 301 may be an ingress node in a network, and the network device 302 may be an intermediate node in the network. With reference to the application scenario shown in FIG. 1A, the network device 301 may be the node S, and the network device 302 may be the node A, the node B, the node C, the node E, or the node F. The method includes the following steps.

S310: The network device 301 obtains an original segment list corresponding to a packet forwarding path. The original segment list includes original segment identifiers that are sequentially arranged, and each original segment identifier in the original segment identifiers that are sequentially arranged corresponds to one network device on the packet forwarding path.

S311: The network device 301 compares S successively adjacent original segment identifiers in the original segment list to generate C successively adjacent compressed segment identifiers. The C compressed segment identifiers are in a one-to-one correspondence with C original segment identifiers in the S original segment identifiers, a sequence of the C compressed segment identifiers is the same as a sequence of the C original segment identifiers, and a length of each of the C compressed segment identifiers is less than a length of a corresponding original segment identifier. S is a positive integer, C is a positive integer, and C is less than or equal to S.

S312: The network device 301 generates a compressed segment list, where the compressed segment list includes the C successively adjacent compressed segment identifiers, and the compressed segment list is used to forward a packet along the packet forwarding path.

For specific processes of steps S310, S311, and S312, refer to the descriptions of steps S201, S202, and S203 in the embodiments of this application. Similarities are not described herein again. The network device 301 may obtain the original segment list corresponding to the packet forwarding path from a controller in the network.

In an example, after generating the compressed segment list, the network device 301 further generates a first flag corresponding to the compressed segment list, where a value of the first flag is a length value of the compressed segment identifier in the compressed segment list. The value of the first flag may be a positive integer. With reference to the application scenario shown in FIG. 1A, the node S receives the original segment list from the controller in the network, and generates a compressed segment list, that is, [1AAA: BBB1, 2AAA:BBB2, 3AAA:BBB3, 4AAA:BBB4; 5AAA: BBB5, 6AAA:BBB6]. The node S generates the first flag corresponding to the compressed segment list, and a length of the compressed segment identifier in the compressed segment list is 4 bytes, so that the value of the first flag is 4. The first flag corresponds to the compressed segment list.

S313: The network device 301 receives a packet, where the packet is forwarded along the packet forwarding path, and the network device 301 encapsulates the compressed segment list into the packet.

The network device 301 may encapsulate the compressed segment list into a routing header (routing header) of a first packet. Optionally, the routing header of the first packet may be an SRH. Optionally, the routing header of the first packet may be a new-format routing header. For example, the new-format routing header may be referred to as a differentiated routing header (difference routing header, DRH) or a compressed routing header (compressed routing header, CRH). It should be noted that, in an SRv6 network, the segment list needs to be in reverse order when being encapsulated into a packet. For example, the six compressed segment identifiers 1AAA:BBB1, 2AAA:BBB2, 3AAA: BBB3, 4AAA:BBB4, 5AAA:BBB5, 6AAA:BBB6 sequentially correspond to the node A, the node B, the node C, the node E, and the node F on the packet forwarding path; and the compressed segment list is [1AAA:BBB1, 2AAA:

BBB2, 3AAA:BBB3, 4AAA:BBB4, 5AAA:BBB5, 6AAA:BBB6] based on a sequence of the corresponding nodes on the packet forwarding path. However, when the compressed segment list is encapsulated into a packet header, the sorting order is reversed. The compressed segment list encapsulated in the packet header in reverse order is [6AAA:BBB6, 5AAA:BBB5, 4AAA:BBB4, 3AAA:BBB3, 2AAA:BBB2, 1AAA:BBB1].

Figure 3B:
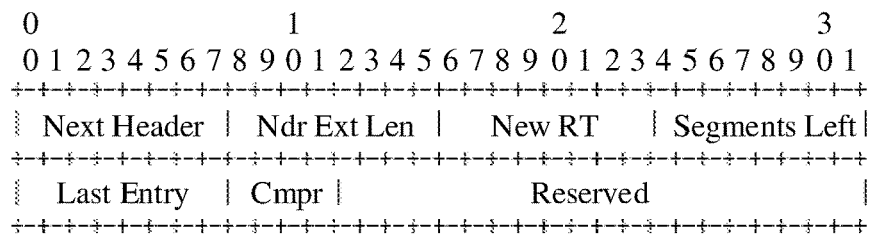
FIG. 3B is a format of a packet header format according to an embodiment of the present disclosure.

In an example, the network device 301 may encapsulate, into a packet, the generated first flag corresponding to the compressed segment list. For example, the network device 301 may encapsulate the first flag into a routing header of the packet. For example, the network device 301 may encapsulate the first flag into a compressed internal (compress internal, Cmpr) field in the routing header of a packet. FIG. 3B shows a format of a packet header according to an embodiment of this application. In addition to the Cmpr field, the packet header further includes: a next header field indicating a next packet header, a Hdr Ext Len field indicating a packet header extension length, a routing type field indicating a routing type, and a segment left field indicating a segment left, and a last entry field indicating a last entry. A length of the Cmpr field is 4 bits.

In an example, the network device 301 may generate a special segment identifier based on the generated first flag corresponding to the compressed segment list, and encapsulate the special segment identifier into a destination address (destination address, DA) field in the packet header of the packet. A first part of the special segment identifier is a locator part in the SID of a next-hop node, and a second part of the special segment identifier is a function ID part. A function ID part in the special segment identifier represents an END.CXSID function, where X is a value of the first flag. The function is to identify the length of the compressed segment identifier in the compressed segment list as X. For example, when the first flag is 2, a function represented by the function ID part in the special segment identifier is END.C2SID, that is, the length of the compressed segment identifier in the compressed segment list is identified as 2.

Optionally, a function ID part that represents the END.CXSID function in all nodes on the packet transmission path may be the same or different.

In one example, the length of the compressed segment identifier may be obtained from the compressed segment identifier. For example, the length of the compressed segment identifier may be included in a function instruction represented by a function field in the compressed segment identifier, or the length of the compressed segment identifier may be included in a flavor (flavor) in the compressed segment identifier. The segment identifier obtained by the network device 301 includes the special segment identifier dedicated to the compressed segment list, and the length of the compressed segment identifier is indicated in a function represented by the function field in the special segment identifier or indicated in the flavor in the special segment identifier. The network device 301 may generate the compressed segment list based on the special segment identifier. The special segment identifier may be a segment identifier whose length is 128 bits, or may be a compressed segment identifier whose length is less than 128 bits. Therefore, when the DA field in the packet includes the special segment identifier, that is, when the special segment identifier is a current segment identifier in the DA field, the network device that receives the packet learns the length of the compressed segment identifier based on the special segment identifier. In this way, the network device continues to obtain a next compressed segment identifier from the compressed segment list based on the length, and updates the next compressed segment identifier to the DA field in the packet.

In an example, the network device 301 may further generate a second flag corresponding to the compressed segment list, and encapsulate the second flag into the packet. The second flag is used to indicate that the compressed segment list includes the compressed segment identifier. Optionally, a length of the second flag may be 1 bit, and when the second flag is 1, it indicates that the compressed segment list includes the compressed segment identifier. Optionally, the network device 301 may encapsulate the second flag into the routing header of the packet.

In an example, the network device 301 may further generate a third flag corresponding to the compressed segment list, and encapsulate the third flag into the packet. The third flag is used to indicate that the compressed segment list includes the last original segment identifier in the original segment list, that is, the last original segment identifier is not compressed. Optionally, a length of the third flag may be 1 bit, and when the third flag is 1, it indicates that the compressed segment list includes the last original segment identifier in the original segment list, that is, the last original segment identifier is not compressed. Optionally, the network device 301 may encapsulate the third flag into the routing header of the packet.

S314: The network device 301 sends the packet that carries the compressed segment list.

The packet may further carry the first flag. The packet may further carry the second flag. The packet may further carry the third flag.

S315: The network device 302 receives the packet sent by the network device 301, where the packet includes the compressed segment list, the segment list corresponds to the forwarding path of the packet, and the compressed segment list includes the compressed segment identifier.

The network device 302 receives the packet sent by the network device 301. Optionally, the network device 301 is directly connected to the network device 302 over a network link, and the network device 301 directly sends the packet to the network device 302 over the link. Optionally, another intermediate node exists between the network device 301 and the network device 302. A packet is sent by the network device 301, and arrives at the network device 302 after forwarded by one or more other intermediate nodes.

S316: The network device 302 generates an original segment identifier based on the compressed segment identifier and a destination address of the packet. The original segment identifier corresponds to a next-hop node of the second network device on the forwarding path of the packet, and the length of the compressed segment identifier is less than a length of the original segment identifier.

In an example, the network device 302 reads the first flag from the packet, where the value of the first flag is the length of the compressed segment identifier in the compressed segment list. The network device 302 reads the compressed segment identifier from the compressed segment list based on the value of the first flag.

In an example, the network device 302 adds the compressed segment identifier and the destination address of the packet to generate the original segment identifier.

With reference to the application scenario shown in FIG. 1A, the network device 302 may be the node B. The node B receives a packet sent by the node S, where the packet includes a compressed segment list. As described above, the compressed segment list in this case is a compressed segment list in reverse order, for example, [0:1000:0001, 0:1000:0001, 0:1000:0001, 0:1000:0001, 0:1000:0001;

0:1000:0001]. The node B reads the first flag from the packet, where the value of the first flag is 5, indicating that the length of the compressed segment identifier in the compressed segment list is 5 bytes. The node B learns, based on the value of 5 of the first flag, that a length of each compressed segment identifier in the current compressed segment list is 5 bytes. Optionally, the node B further needs to determine a currently processed compressed segment identifier based on a value of the segment left (segment left, SL) field. For example, the SL=4, and the node B learns that the currently processed compressed segment identifier is the fourth compressed segment identifier. Therefore, the node B obtains that the currently processed compressed segment identifier is 0:1000:0001. A most significant bit of the compressed segment identifier is a sign bit. Specifically, the most significant bit of the compressed segment identifier is 1, indicating that the compressed segment identifier is positive. The node B obtains the destination address of the packet. Optionally, the destination address of the packet is an address in the destination address field in the packet header of the packet. For example, the destination address may be AAAA:BBBB:CCCC:DDDD:EEEE:FFFF:2AAA:BBB2. The node B adds the compressed segment identifier and the destination address, to obtain an addition result of AAAA:BBBB:CCCC:DDDD:EEEE:FFFF:3AAA:BBB3, where the addition result is the original segment identifier. The original segment identifier is a SID of the next-hop node of the node B on the forwarding path of the packet. For example, the original segment identifier is a SID of the node C.

In an example, the network device reads the second flag from the packet, and reads the compressed segment identifier from the compressed segment list based on an indication of the second flag.

In an example, the network device 302 receives a fourth control packet from the controller in the network, where the fourth control packet includes a fourth flag, a value of the fourth flag is N, N is a positive integer, and first N bytes of the S original segment identifiers are the same. The network device 302 obtains, based on the first flag, that the length of the compressed segment identifier is M−N bytes, where M is a positive integer, and the length of the original segment identifier is M bytes. The original segment identifier may be a SID in the SRv6 network. The network device 302 reads the compressed segment identifier from the compressed segment list based on the length of M−N bytes of the compressed segment identifier.

In an example, the network device replaces a to-be-replaced part in the destination address of the packet with the compressed segment identifier, where a length of the to-be-replaced part is the same as the length of the compressed segment identifier. With reference to the foregoing description, when the compressed segment identifier is generated, the same first N bytes in the original segment identifiers may be omitted, or the same first N bytes in first parts of the original segment identifiers may be omitted, where the first parts each includes a locator field and a function field. The to-be-replaced part varies with different omission manners used in generating the compressed segment identifier. When the compressed segment identifier is last M−N bytes of the original segment identifier, the to-be-replaced part is last M−N bytes of the DA field; when the compressed segment identifier is middle several bytes of the original segment identifier, the to-be-replaced part is the middle several bytes of the DA field.

In an example, the network device 302 replaces the last M−N bytes of the DA field in the packet header of the packet with the compressed segment identifier, to generate the original segment identifier.

With reference to the application scenario shown in FIG. 1A, the network device 302 may be the node B. The node B receives a packet sent by the node S, where the packet includes a compressed segment list, and the compressed segment list may be [6AAA:BBB6, 5AAA:BBB5, 4AAA:BBB4, 3AAA:BBB3, 2AAA:BBB2, 1AAA:BBB1]. The node B receives a first control packet from the controller, where the first control packet includes the first flag, and the value of the first flag is 12, that is, first 12 bytes of the six original segment identifiers in the original segment list are the same. The node B obtains that the length of the compressed segment identifier in the compressed segment list is 4 bytes based on the value of 12 of the first flag and a length of 16 bytes of the SID in the SR network. Optionally, the node B further needs to determine a currently processed compressed segment identifier based on the value of the segment left (segment left, SL) field. For example, the SL=4, and the node B learns that the currently processed compressed segment identifier is the fourth compressed segment identifier. Therefore, the node B obtains that the currently processed compressed segment identifier is 3AAA:BBB1. The node B obtains the destination address of the packet. Optionally, the destination address of the packet is an address in the destination address field in the packet header of the packet. For example, the destination address may be AAAA:BBBB:CCCC:DDDD:EEEE:FFFF:2AAA:BBB2. The node B replaces last four bytes of a destination address of the first packet with the compressed segment identifier, to obtain a result of AAAA:BBBB:CCCC:DDDD:EEEE:FFFF:3AAA:BBB3, where the result is the original segment identifier. The original segment identifier is a SID of the next-hop node of the node B on the forwarding path of the packet. For example, the original segment identifier is a SID of the node C.

In an example, the network device 302 reads the function ID part in the special segment identifier from the DA field in the packet header, and obtains, based on that the function ID part is END.CXSID, that the length of the compressed segment identifier in the compressed segment list is X bytes. The network device 302 reads the compressed segment identifier from the compressed segment list based on the X-byte length of the compressed segment identifier.

In an example, the network device 302 receives a fourth control packet from the controller in the network, where the fourth control packet includes a fourth flag, a value of the fourth flag is N, N is a positive integer, and first N bytes of the S original segment identifiers are the same. The network device 302 obtains, based on the fourth flag, that a length of the first part of the compressed segment identifier is LA−N bytes, where LA is a positive integer, and a length of the locator part in the original segment identifier is LA bytes. The original segment identifier may be a SID in the SRv6 network. The network device 302 obtains the first part of the compressed segment identifier from the compressed segment identifier based on the length of LA−N bytes of the first part of the compressed segment identifier. Further, the network device 302 obtains content other than the first part from the compressed segment identifier, that is, a second part of the compressed segment identifier.

In an example, the network device 302 replaces last LA−N bytes of a locator part in the DA field in the packet header with the first part of the compressed segment identifier, to generate the locator part in the original segment identifier.

In an example, the network device 302 receives a correspondence between each compressed function ID and each node operation, or the network device 302 receives a correspondence between each compressed function ID and a function ID part in each SID. These correspondences may be sent by the network device 301, or may be sent by the controller in the network. The network device 302 uses the second part of the compressed segment identifier as the compressed function ID, and obtains the function ID part of the original segment identifier based on the received correspondence between each compressed function ID and each node operation or the correspondence between each compressed function ID and the function ID part in each SID.

An example is provided with reference to the application scenario shown in FIG. 1A. The network device 302 may be the node B. The node B receives a packet sent by the node S, where the packet includes a compressed segment list, and the compressed segment list may be [6AB6, 5AB5, 4AB4, 3AB3, 2AB2, 1AB1]. The node B obtains the DA field from the packet header of the packet, where a compressed function part in the DA field is END.C2SID, and a locator part in the DA field is AAAA:BBBB:CCCC:DDDD:EEEE: FFFF:2A. The node B obtains, based on the compressed function ID of END.C2SID in the DA field, that the length of the compressed segment identifier in the compressed segment list is 2 bytes. The node B reads the compressed segment identifier from the compressed segment list based on the 2-byte length of the compressed segment identifier. Optionally, the node B further needs to determine a currently processed compressed segment identifier based on the value of the segment left (segment left, SL) field. For example, the SL=4, and the node B learns that the currently processed compressed segment identifier is the fourth compressed segment identifier. Therefore, the node B obtains that the currently processed compressed segment identifier is 3AB3. The node B receives a first control packet from the controller in the network, where the first control packet includes a fourth flag, and a value of the fourth flag is 12, indicating that the first 12 bytes of the original segment identifiers are the same. The node B obtains, based on the value of 12 of the fourth flag and a 13-byte length of the locator part in the SID in the SR network, that the length of the first part of the compressed segment identifier is 13−12=1 byte. The node B obtains that the first part of the compressed segment identifier is 3A based on the 1-byte length of the first part of the compressed segment identifier, where the second part of the compressed segment identifier is B3. The node B replaces a last byte of the locator part in the DA field with 3A, to generate the locator part in the original segment identifier as AAAA:BBBB:CCCC:DDDD:EEEE:FFFF:3A. The node B receives the correspondence between each compressed function and the function ID part in each SID that is sent by the node S. When the compressed function ID is B3, a corresponding function ID part in the SID is AA:BBB3. Therefore, the node B obtains, based on the compressed function ID part of B3, that the function part of the original segment identifier is AA:BBB3. Therefore, the node B obtains the original segment identifier as AAAA:BBBB:CCCC:DDDD: EEEE:FFFF:3AAA:BBB3.

In an example, the network device 302 replaces an address in the DA field in the packet header of the packet with the obtained original segment identifier.

With reference to the application scenario shown in FIG. 1A, the network device 302 may be the node B. The node B obtains the original segment identifier of AAAA:BBBB: CCCC:DDDD:EEEE:FFFF:3AAA:BBB3, and the node B replaces an address in a destination address (Destination Address, DA) field in a packet header of the first packet with the original segment identifier.

In an example, the network device 302 replaces a first part of the DA field in the packet header with a first part of the original segment identifier.

With reference to the application scenario shown in FIG. 1A, the network device 302 may be the node B. The first part of the DA field, that is, the locator part, may be AAAA: BBBB:CCCC:DDDD:EEEE:FFFF:2A. The node B obtains the original segment identifier of AAAA:BBBB:CCCC: DDDD:EEEE:FFFF:3AAA:BBB3, and the node B replaces the first part of the DA field with the first part of the original segment identifier, that is, the locator part. A first part of the DA field after the replacement is AAAA:BBBB:CCCC: DDDD:EEEE:FFFF:3A.

In an example, the network device 302 obtains a corresponding node operation based on the compressed function ID part in the compressed segment identifier, and performs the node operation. With reference to the application scenario shown in FIG. 1A, the network device 302 may be the node B. The node B receives the correspondence between each compressed function ID and each node operation. The node B obtains that the compressed function ID part in the compressed segment identifier is B3. A corresponding node operation is obtained from the foregoing correspondence based on the compressed function ID part of B3, and the node operation is performed.

In an example, the network device 302 obtains a corresponding node operation based on the obtained function ID part in the original segment identifier, and performs the node operation. With reference to the application scenario shown in FIG. 1A, the network device 302 may be the node B. The node B receives the correspondence between each compressed function ID and the function ID part in each SID. The node B obtains that the compressed function ID part in the compressed segment identifier is B3. The function ID part of AA:BBB3 in the SID is obtained from the foregoing correspondence based on the compressed function ID part of B3. Then, a corresponding node operation is obtained based on the function ID part of AA:BBB3 in the SID, and the node operation is performed.

In an example, the network device 302 does not replace the second part of the DA field in the packet header of the packet. The second part of the DA field is the function ID part. Specifically, the function ID part in the DA field is a function ID corresponding to the foregoing END.CXSID function. In one case, function IDs corresponding to the foregoing END.CXSID function in all nodes on the packet forwarding path are the same. In this case, the network device 302 does not need to replace the second part of the DA field in the packet header of the packet. When the packet arrives at a next-hop node, the next-hop node obtains the second part of the DA field, that is, the function ID part, and obtains the corresponding END.CXSID function based on the function ID part.

In an example, the network device 302 replaces the second part of the DA field in the packet header of the packet. With reference to the foregoing description, in another case, function IDs corresponding to the foregoing END.CXSID function in different nodes on the packet forwarding path are different. In this case, the network device 302 needs to replace the second part of the DA field in the packet header of the packet. In this case, the network device 302 further receives a correspondence between the END.CXSID function and the function ID representing the function in each node. Specifically, the network device 302 obtains the locator part of the original segment identifier based on the first part of the compressed segment identifier, where the locator part of the original segment identifier indicates the next-hop node of the network device 302 on the packet forwarding path. The network device 302 obtains, based on the received correspondence between the END.CXSID function and the function ID representing the function in each node, a function ID representing the function in the next-hop node, and replaces the second part of the DA field in the packet header of the packet with the function ID.

S317: The network device 302 sends the packet to the next-hop node based on the original segment identifier.

In an example, the original segment identifier is a binding segment identifier used to indicate the next-hop node to send a packet including the binding segment identifier to a node corresponding to the binding segment identifier.

With reference to the application scenario shown in FIG. 1A, the network device 302 may be the node E. The node F advertises the binding SID AAAA:BBBB:CCCC:DDDD:EEEE:FFFF:6AAA:BBB6 ABCD:ABCD:ABCD:ABCD:ABCD:ABCD:6AAA:BBB6 through network configuration, where the ABCD:ABCD:ABCD:ABCD:ABCD:ABCD:6AAA:BBB6 may be a SID corresponding to the node G (which is not shown in FIG. 1A), and the AAAA:BBBB:CCCC:DDDD:EEEE:FFFF:6AAA:BBB6 may be a SID corresponding to the node F. The node E receives the first packet sent by the node S, where the first packet includes the compressed segment list, and the compressed segment list may be [6AAA:BBB6, 5AAA:BBB5, 4AAA:BBB4, 3AAA:BBB3, 2AAA:BBB2, 1AAA:BBB1]. The node E generates, based on the compressed segment identifier in the compressed segment list and the destination address of the packet, the original segment identifier as AAAA:BBBB:CCCC:DDDD:EEEE:FFFF:6AAA:BBB6, that is, a SID of the node F. For a process of obtaining the original segment identifier, refer to the description in the foregoing method. Similarities are not described herein again. The node E sends the first packet to a next-hop node, namely, the node F, based on the original segment identifier. After the packet arrives at the node F, the node F queries forwarding entries and learns that the AAAA:BBBB:CCCC:DDDD:EEEE:FFFF:6AAA:BBB6 is the binding SID and the binding SID of AAAA:BBBB:CCCC:DDDD:EEEE:FFFF:6AAA:BBB6=ABCD:ABCD:ABCD:ABCD:ABCD:ABCD:6AAA:BBB6. The ABCD:ABCD:ABCD:ABCD:ABCD:ABCD:6AAA:BBB6 is the SID corresponding to the node G. The node F sends the packet to the node G.

Figure 4:
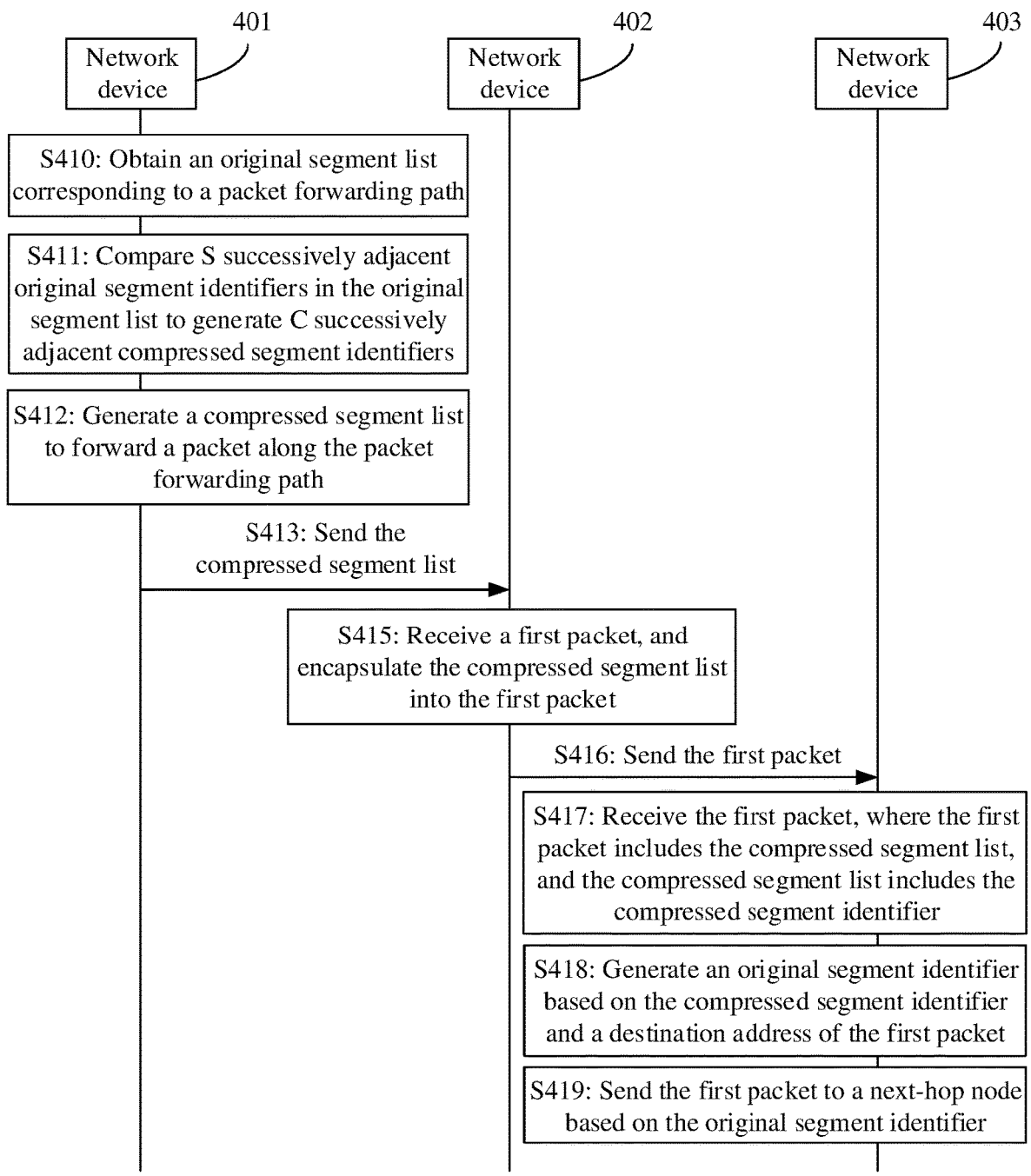
FIG. 4 is a method for generating a segment list according to an embodiment of the present disclosure.

Refer to FIG. 4. Embodiment 3 of this application provides a method for generating a segment list. The method involves a network device 401, a network device 402, and a network device 403. The network device 401 may be a controller in a network, the network device 402 may be an ingress node in the network, and the network device 403 may be an intermediate node in the network. With reference to the application scenario shown in FIG. 1B, the network device 401 may be a controller, the network device 402 may be the node S, and the network device 403 may be the node A, the node B, the node C, the node E, or the node F. The method includes the following steps.

S410: The network device 401 obtains an original segment list corresponding to a packet forwarding path. The original segment list includes original segment identifiers that are sequentially arranged, and each original segment identifier in the original segment identifiers that are sequentially arranged corresponds to one network device on the packet forwarding path.

S411: The network device 401 compares S successively adjacent original segment identifiers in the original segment list to generate C successively adjacent compressed segment identifiers. The C compressed segment identifiers are in a one-to-one correspondence with C original segment identifiers in the S original segment identifiers, a sequence of the C compressed segment identifiers is the same as a sequence of the C original segment identifiers, and a length of each of the C compressed segment identifiers is less than a length of a corresponding original segment identifier. S is a positive integer, C is a positive integer, and C is less than or equal to S.

S412: The network device 401 generates a compressed segment list, where the compressed segment list includes the C successively adjacent compressed segment identifiers, and the compressed segment list is used to forward a packet along the packet forwarding path.

For specific processes of steps S410, S411, and S412, refer to the respective descriptions of steps S201, S202, and S203 in the embodiment shown in FIG. 2. Similarities are not described herein again.

In an example, the network device 401 generates a first control packet, where the first control packet includes the compressed segment list and a first flag. A value of the first flag is a length value of the compressed segment identifier in the compressed segment list. With reference to the application scenario shown in FIG. 1B, the controller generates, based on the original segment list, the compressed segment list as [0:1000:0001, 0:1000:0001, 0:1000:0001, 0:1000:0001, 0:1000:0001, 0:1000:0001]. The controller further generates the first flag corresponding to the compressed segment list. If the length of the compressed segment identifier in the compressed segment list is 5 bytes, the value of the first flag is 5. The first control packet may be one or more packets.

In an example, the network device 401 further generates a second control packet, where the second control packet includes the compressed segment list and a second flag. The second flag is used to indicate that the compressed segment list includes the compressed segment identifier. Optionally, a length of the second flag may be 1 bit, and when the second flag is 1, it indicates that the compressed segment list includes the compressed segment identifier. The first control packet may be one or more packets.

In an example, the network device 401 further generates a third control packet corresponding to the compressed segment list, where the third control packet includes a third flag corresponding to the compressed segment list. The third flag is used to indicate that the compressed segment list includes the last original segment identifier in the original segment list, that is, the last original segment identifier is not compressed. Optionally, a length of the third flag may be 1 bit, and when the third flag is 1, it indicates that the compressed segment list includes the last original segment identifier in the original segment list, that is, the last original segment identifier is not compressed.

In an example, the network device 401 generates a fourth control packet corresponding to the compressed segment list, where the fourth control packet includes a fourth flag, a value of the fourth flag is N, N is a positive integer, and first N bytes of the S original segment identifiers are the same.

In an example, the compressed segment identifier includes a special segment identifier, and the special segment identifier can indicate the length of the compressed segment identifier in the compressed segment list. For example, the length of the compressed segment identifier may be included in a function instruction represented by a function field in the compressed segment identifier, or the length of the compressed segment identifier may be included in a flavor (flavor) in the compressed segment identifier.

S413: The network device 401 sends the compressed segment list to the network device 402.

In an example, the network device 401 further sends the first control packet including the first flag to the network device 402.

In an example, the network device 401 further sends the second control packet including the second flag to the network device 402.

In an example, the network device 401 further sends the third control packet including the third flag to the network device 402.

In an example, the network device 401 further sends the fourth control packet including the fourth flag to the network device 403. The network device 403 may be an intermediate node in the network. With reference to the application scenario shown in FIG. 1B, the network device 403 may be the node A, the node B, the node C, the node E, or the node F.

In an example, the network device 401 sends, to the network device 402, a segment routing policy (segment routing policy, SR policy) including the compressed segment list. The segment policy further includes a binding segment identifier (binding SID) corresponding to the compressed segment list.

In an example, when the forwarding path of the packet includes a plurality of sub-paths, and the plurality of sub-paths are respectively included in a plurality of different segment policies, the network device 401 sends the plurality of segment policies to respective ingress network devices of the plurality of sub-paths. The plurality of segment policies each include a compressed segment list corresponding to the sub-path and the binding segment identifier corresponding to the compressed segment list.

S414: The network device 402 receives the packet, where the packet is forwarded along the packet forwarding path, and the network device 402 encapsulates the compressed segment list into the packet.

In an example, the network device 402 further encapsulates the first flag in the first control packet received from the controller into a routing header of the packet. Optionally, the network device 402 may encapsulate the first flag into a Cmpr field in the routing header of the packet. Optionally, the network device 403 may generate a special segment identifier including the first flag, and place the special segment identifier into a DA field in a packet header of the packet.

In an example, the network device 402 further encapsulates the second flag in the second control packet received from the controller into the routing header of the packet.

In an example, the network device 402 further encapsulates the third flag in the third control packet received from the controller into the routing header of the packet.

S415: The network device 402 sends the packet that carries the compressed segment list.

The packet may further carry the first flag. The packet may further carry the second flag. The packet may further carry the third flag.

S416: The network device 403 receives the packet sent by the network device 402, where the packet includes the compressed segment list, the segment list corresponds to the forwarding path of the packet, and the compressed segment list includes the compressed segment identifier.

S417: The network device 403 generates an original segment identifier based on the compressed segment identifier and a destination address of the packet. The original segment identifier corresponds to a next-hop node of the second network device on the forwarding path of the packet, and the length of the compressed segment identifier is less than a length of the original segment identifier.

S418: The network device 403 sends the packet to the next-hop node based on the original segment identifier.

For specific processes of steps S416, S417, and S418, refer to the respective descriptions of steps S315, S316, and S317 in Embodiment 1 of this application. Similarities are not described herein again.

Figure 5:
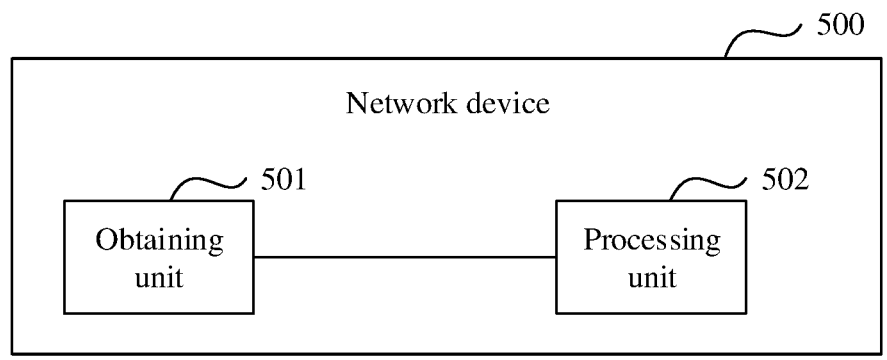
FIG. 5 is a schematic diagram of a structure of a network device according to an embodiment of the present disclosure.

FIG. 5 is a schematic diagram of a possible structure of the network device in the foregoing embodiment. A network device 500 may implement functions of the network device in the embodiment shown in FIG. 2, the network device 301 in the embodiment shown in FIG. 3, or the network device 401 in the embodiment shown in FIG. 4. Refer to FIG. 5. The network device 500 includes an obtaining unit 501 and a processing unit 502. These units may perform corresponding functions of the network device in the foregoing method examples.

For example, the obtaining unit 501 is configured to obtain an original segment list corresponding to a packet forwarding path, where the original segment list includes original segment identifiers that are sequentially arranged, and each original segment identifier in the original segment identifiers that are sequentially arranged corresponds to one node or link on the packet forwarding path.

The processing unit 502 is configured to compare S successively adjacent original segment identifiers in the original segment list to generate C successively adjacent compressed segment identifiers. The C compressed segment identifiers are in a one-to-one correspondence with C original segment identifiers in the S original segment identifiers, and a length of each of the C compressed segment identifiers is less than a length of a corresponding original segment identifier. S is a positive integer, C is a positive integer, and C is less than or equal to S.

The processing unit 502 is further configured to generate a compressed segment list, where the compressed segment list includes the C successively adjacent compressed segment identifiers, positions of the C compressed segment identifiers in the compressed segment list correspond to positions of the C original segment identifiers in the original segment list, and the compressed segment list is used to forward a packet along the packet forwarding path.

Figure 6:
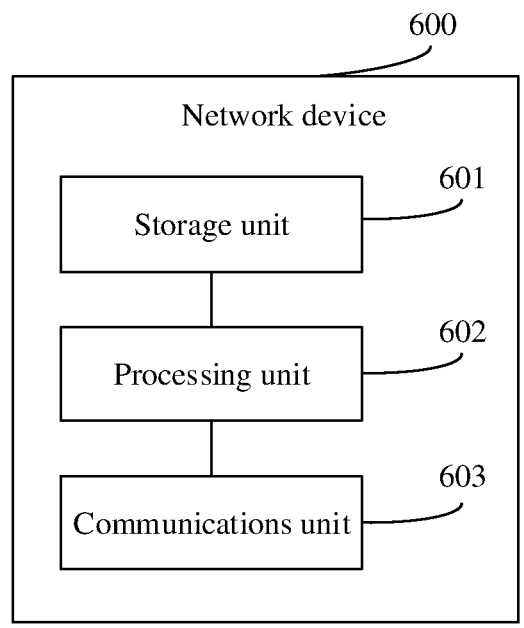
FIG. 6 is a schematic diagram of a structure of a network device according to an embodiment of the present disclosure.

For example, an integrated unit is used. FIG. 6 is a possible schematic diagram of another structure of the network device in the foregoing embodiment. A network device 600 may implement functions of the network device in the embodiment shown in FIG. 2, the network device 301 in the embodiment shown in FIG. 3, or the network device 401 in the embodiment shown in FIG. 4.

The network device 600 includes a storage unit 601, a processing unit 602, and a communications unit 603. The processing unit 602 is configured to control and manage an action of the network device 600. For example, the processing unit 602 is configured to support the network device 600 in performing the processes S201, S202, and S203 in FIG. 2, the processes S310, S311, S312, S313, and S314 in FIG. 3, processes S410, S411, and S412 in FIG. 4, and/or other processes used in the technologies described in this specification. The communications unit 603 is configured to support communication between the network device 600 and another network entity, for example, communication with the network device 302 in the embodiment shown in FIG. 3 or the network device 402 in the embodiment shown in FIG. 4. The storage unit 601 is configured to store program code and data of the network device 600.

The processing unit 602 may be a processor, for example, a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logic device, a transistor logic device, a hardware component, or any combination thereof. The processing unit 602 may implement or execute various example logical blocks, modules, and circuits described with reference to content disclosed in the embodiments of the present disclosure. The processor may be a combination of processors implementing a computing function, for example, a combination including one or more microprocessors, or a combination of a DSP and a microprocessor. The communications unit 603 may be a network interface, and the storage unit 601 may be a memory.

When the processing unit 602 is a processor, the communications unit 603 is a network interface. When the storage unit 601 is a memory, the network device in this embodiment of the present disclosure may be a network device 700 shown in FIG. 7.

Figure 7:
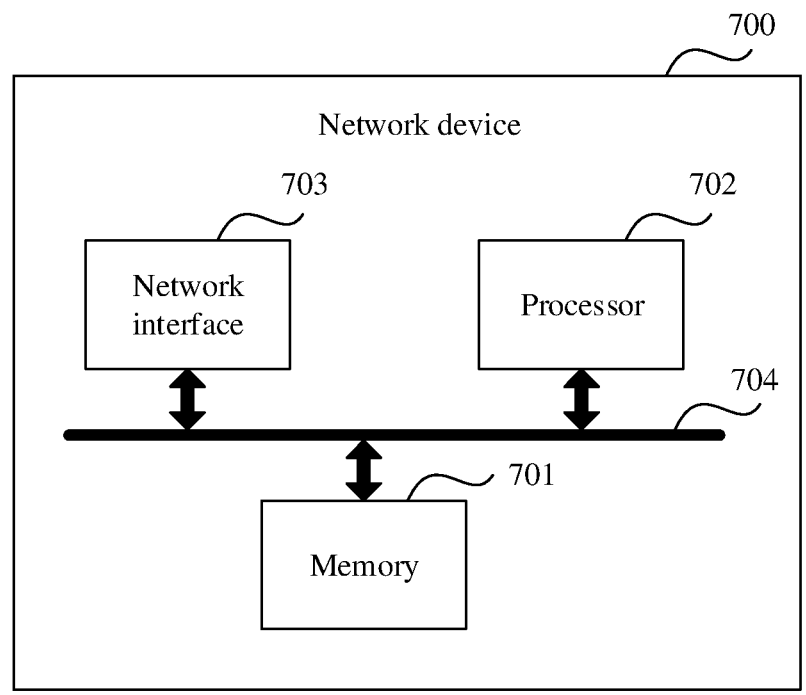
FIG. 7 is a schematic diagram of a structure of a network device according to an embodiment of the present disclosure.

FIG. 7 is a schematic diagram of another possible structure of the network device in the foregoing embodiment. A network node 700 includes a processor 702, a network interface 703, a memory 701, and a bus 704.

The memory 701 is configured to store instructions. When the embodiment shown in FIG. 5 is implemented and the units described in the embodiment of FIG. 5 are implemented by using software, software or program code required for performing functions of the receiving unit 501 and the processing unit 502 in FIG. 5 is stored in the memory 701.

The processor 702 is configured to execute the instructions in the memory 701, to perform the foregoing method applied to the embodiments shown in FIG. 2 to FIG. 4 for generating a segment list by the network device.

The network interface 703 is used for communication.

The network interface 703 may be an Ethernet (Ethernet) interface, an asynchronous transfer mode (asynchronous transfer mode, ATM) interface, or the like.

The transceiver 703, the processor 702, and the memory 701 are connected to each other through the bus 704. The bus 704 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 7, but this does not mean that there is only one bus or only one type of bus.

In a specific embodiment, the processor 702 is configured to: obtain an original segment list corresponding to a packet forwarding path, where the original segment list includes original segment identifiers that are sequentially arranged, and each original segment identifier in the original segment identifiers that are sequentially arranged corresponds to one node or link on the packet forwarding path; compare S successively adjacent original segment identifiers in the original segment list to generate C successively adjacent compressed segment identifiers, where the C compressed segment identifiers are in a one-to-one correspondence with C original segment identifiers in the S original segment identifiers, and a length of each of the C compressed segment identifiers is less than a length of a corresponding original segment identifier, where S is a positive integer, C is a positive integer, and C is less than or equal to S; and generate a compressed segment list, where the compressed segment list includes the C successively adjacent compressed segment identifiers, positions of the C compressed segment identifiers in the compressed segment list correspond to positions of the C original segment identifiers in the original segment list, and the compressed segment list is used to forward a packet along the packet forwarding path. For a detailed processing process of the processor 702, refer to the detailed descriptions of S201, S202, and S203 in the embodiment shown in FIGS. 2, S310, S311, S312, and S313 in the embodiment shown in FIG. 3, and processes S410, S411, and S412 in FIG. 4. Details are not described herein again.

The network interface 703 is used by the network device to send and receive a packet or a segment list by using a network system. For a specific process, refer to the detailed descriptions of S314 in the embodiment shown in FIGS. 3 and S413 in the embodiment shown in FIG. 4. Details are not described herein again.

Figure 8:
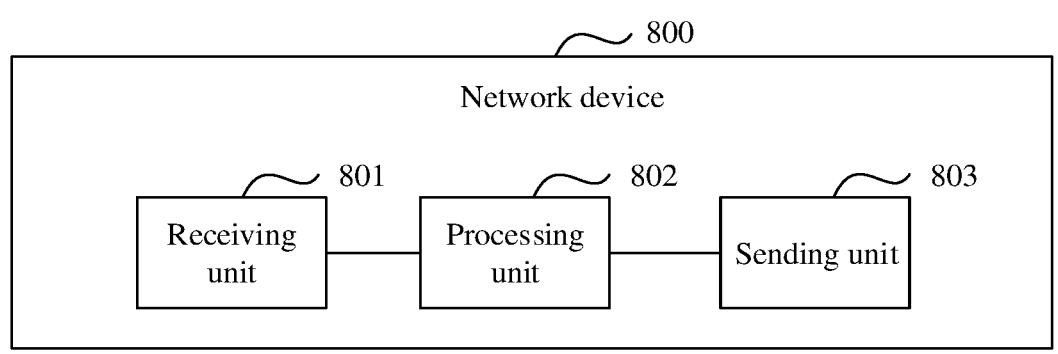
FIG. 8 is a schematic diagram of a structure of a network device according to an embodiment of the present disclosure.

FIG. 8 is a schematic diagram of a possible structure of the network device in the foregoing embodiment. A network device 800 may implement a function of the network device 302 in the embodiment shown in FIG. 3 or the network device 403 in the embodiment shown in FIG. 4. Refer to FIG. 8. The network device 800 includes a receiving unit 801, a processing unit 802, and a sending unit 803. These units may perform corresponding functions of the network device in the foregoing method examples.

For example, the receiving unit 801 is configured to receive a packet, where the packet includes a compressed segment list, the compressed segment list corresponds to a forwarding path of the packet, and the compressed segment list includes a compressed segment identifier.

The processing unit 802 is configured to generate an original segment identifier based on the compressed segment identifier and a destination address of the packet, where the original segment identifier corresponds to a next-hop node of the network device on the forwarding path of the packet, and a length of the compressed segment identifier is less than a length of the original segment identifier.

The sending unit 803 is configured to send the packet to the next-hop node based on the original segment identifier.

Figure 9:
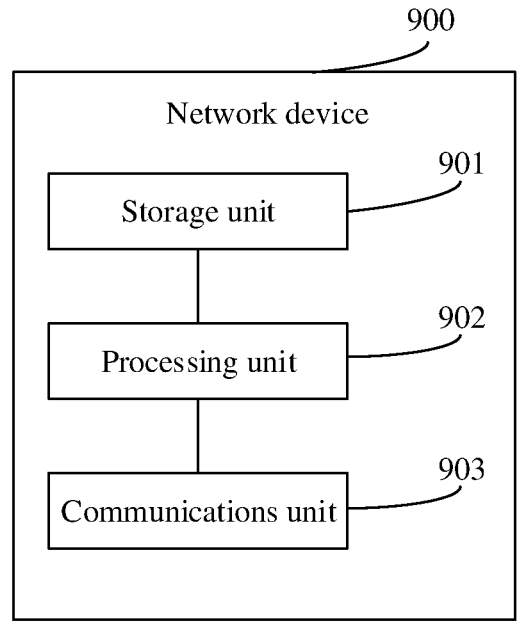
FIG. 9 is a schematic diagram of a structure of a network device according to an embodiment of the present disclosure.

For example, an integrated unit is used. FIG. 9 is a schematic diagram of another possible structure of the network device in the foregoing embodiment. A network device 900 may implement a function of the network device 302 in the embodiment shown in FIG. 3 or the network device 403 in the embodiment shown in FIG. 4.

The network device 900 includes a storage unit 901, a processing unit 902, and a communications unit 903. The processing unit 902 is configured to control and manage an action of the network device 900. For example, the processing unit 902 is configured to support the network device 900 in performing processes S315, S316, and S317 in FIG. 3, processes S417, S418, and S419 in FIG. 4, and/or other processes used in the technologies described in this specification. The communications unit 903 is configured to support communication between the network device 900 and another network entity, for example, communication with the network device 301 in the embodiment shown in FIG. 3 or the network device 402 in the embodiment shown in FIG.

4. The storage unit 901 is configured to store program code and data of the network device 900.

The processing unit 902 may be a processor, for example, may be a CPU, a general-purpose processor, a DSP, an ASIC, an FPGA, or another programmable logic device, a transistor logic device, a hardware component, or any combination thereof. The processing unit 902 may implement or execute various example logical blocks, modules, and circuits described with reference to content disclosed in the embodiments of the present disclosure. The processor may be a combination of processors implementing a computing function, for example, a combination including one or more microprocessors, or a combination of a DSP and a microprocessor. The communications unit 903 may be a transceiver. The storage unit 901 may be a memory.

When the processing unit 902 is a processor, the communications unit 903 is a network interface. When the storage unit 901 is a memory, the network device in this embodiment of the present disclosure may be a network node 1000 shown in FIG. 10.

Figure 10:
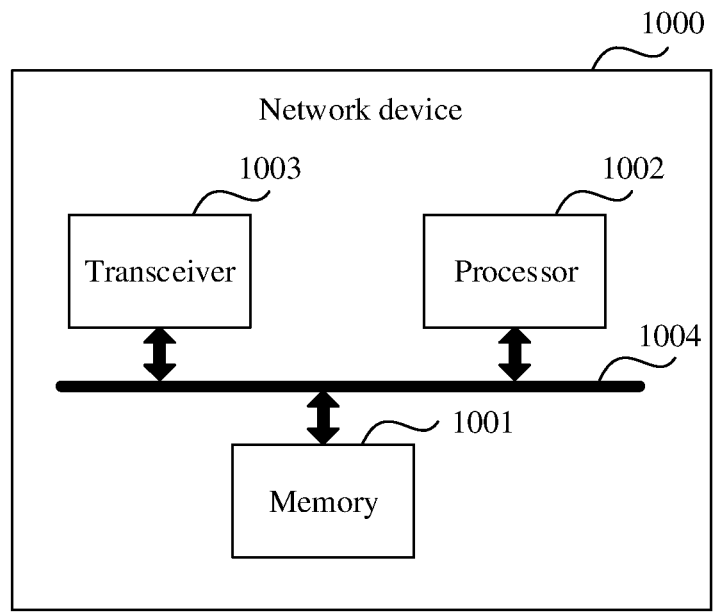
FIG. 10 is a schematic diagram of a structure of a network device according to an embodiment of the present disclosure.

FIG. 10 is a schematic diagram of a possible structure of the network device in the foregoing embodiment. The network node 1000 includes a processor 1002, a network interface 1003, a memory 1001, and a bus 1004.

The memory 1001 is configured to store instructions. When the embodiment shown in FIG. 8 is implemented and the units described in the embodiment of FIG. 8 are implemented by using software, software or program code required for performing functions of the receiving unit 801, the processing unit 802, and the sending unit 803 in FIG. 8 is stored in the memory 1001.

The processor 1002 is configured to execute the instructions in the memory 1001, to perform the foregoing method applied to the embodiments shown in FIG. 2 to FIG. 4 for forwarding a packet by the network device.

The network interface 1003 is used for communication.

The network interface 1003 may be an Ethernet (Ethernet) interface, an asynchronous transfer mode (asynchronous transfer mode, ATM) interface, or the like.

The transceiver 1003, the processor 1002, and the memory 1001 are connected to each other through the bus 1004. The bus 1004 may be a PCI bus, an EISA bus, or the like. The bus may be classified into an address bus, a data bus, a control bus, and the like. For ease of representation, only one thick line is used to represent the bus in FIG. 10, but this does not mean that there is only one bus or only one type of bus.

In a specific embodiment, the processor 1002 is configured to: receive a packet, where the packet includes a compressed segment list, the compressed segment list corresponds to a forwarding path of the packet, and the compressed segment list includes a compressed segment identifier; generate an original segment identifier based on the compressed segment identifier and a destination address of the packet, where the original segment identifier corresponds to a next-hop node of the network device on the forwarding path of the packet, and a length of the compressed segment identifier is less than a length of the original segment identifier; and send the packet to the next-hop node based on the original segment identifier. For a detailed processing process of the processor 1002, refer to the detailed descriptions of S315, S316, and S317 in the embodiment shown in FIG. 3 and processes S417, S418, and S419 in FIG. 4. Details are not described herein again.

The network interface 1003 is used by the network device to send and receive a packet by using a network system. For a specific process, refer to the detailed descriptions of S315 and S317 in the embodiment shown in FIGS. 3 and S417 and S419 in the embodiment shown in FIG. 4. Details are not described herein again.

An embodiment of this application further provides a network system. The network system includes a controller, a first network device, and a second network device. The controller in the network system may perform the processing steps of the network device 401 in the embodiment in FIG. 4, the first network device in the network system may perform the processing steps of the network device 402 in the embodiment in FIG. 4, and the second network device in the network system may perform the processing steps of the network device 403 in the embodiment in FIG. 4. Correspondingly, the controller in the network system may be the network device 500 in the embodiment shown in FIG. 5, and the second network device in the network system is the network device 800 in the embodiment shown in FIG. 8. Alternatively, the controller in the network system may be the network device 600 in the embodiment shown in FIG. 6, and the second network device in the network system is the network device 900 in the embodiment shown in FIG. 9. Alternatively, the controller in the network system may be the network device 700 in the embodiment shown in FIG. 7, and the second network device in the network system is the network device 1000 in the embodiment shown in FIG. 10.

Specifically, the controller is configured to: obtain an original segment list corresponding to a packet forwarding path, where the original segment list includes original segment identifiers that are sequentially arranged, and each original segment identifier in the original segment identifiers that are sequentially arranged corresponds to one node or link on the packet forwarding path; compare S successively adjacent original segment identifiers in the original segment list to generate C successively adjacent compressed segment identifiers, where the C compressed segment identifiers are in a one-to-one correspondence with C original segment identifiers in the S original segment identifiers, and a length of each of the C compressed segment identifiers is less than a length of a corresponding original segment identifier, where S is a positive integer, C is a positive integer, and C is less than or equal to S; and generate a compressed segment list, where the compressed segment list includes the C successively adjacent compressed segment identifiers, positions of the C compressed segment identifiers in the compressed segment list correspond to positions of the C original segment identifiers in the original segment list, and the compressed segment list is used to forward a packet along the packet forwarding path.

The first network device is configured to: receive a packet, where the packet is forwarded along the packet forwarding path; and encapsulate the compressed segment list into the packet.

The second network device is configured to: receive the packet, where the packet includes the compressed segment list, the compressed segment list corresponds to a forwarding path of the first packet, and the compressed segment list includes the compressed segment identifier; generate an original segment identifier based on the compressed segment identifier and a destination address of the first packet, where the original segment identifier corresponds to a next-hop node of the network device on the forwarding path of the packet, and a length of the compressed segment identifier is less than a length of the original segment identifier; and send the packet to the next-hop node based on the original segment identifier.

An embodiment of the present disclosure further provides a non-volatile storage medium, configured to store software instructions used in the foregoing embodiment. The non-volatile storage medium includes a program used to perform the method shown in the foregoing embodiment. When the software instructions are executed on a computer or a network device, the computer or network device is enabled to perform the method in the foregoing method embodiment.

An embodiment of the present disclosure further provides a computer program product including computer program instructions. When the computer program product runs on a network node, the network node is enabled to perform the method in the foregoing method embodiment.

"First" in the first network device, the first flag, the first part, and the first control packet mentioned in the embodiments of the present disclosure is merely used for name identification, and does not represent the first in a sequence. The rule is also applicable to "second," "third," and "fourth."

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected based on actual requirements to achieve the objectives of the solutions of the embodiments. In addition, in the accompanying drawings of the network node embodiments provided by the present disclosure, connection relationships between modules indicate that the modules have communication connections with each other, which may be specifically implemented as one or more communications buses or signal cables. A person of ordinary skill in the art may understand and implement the embodiments without creative efforts.

Methods or algorithm steps described in the content disclosed in the embodiments of the present disclosure may be implemented by hardware, or may be implemented by a processor by executing software instructions. The software instructions may include a corresponding software module. The software module may be stored in a random access memory (random access memory, RAM), a flash memory, a read only memory (read only memory, ROM), an erasable programmable read only memory (erasable programmable ROM, EPROM), an electrically erasable programmable read only memory (electrically EPROM, EEPROM), a hard disk, a removable hard disk, a compact disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network node. Certainly, the processor and the storage medium may exist in the network node as discrete components.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another place. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, improvement, or the like made based on the technical solutions of the present disclosure shall fall within the protection scope of the present disclosure.

The invention claimed is:

1. A network device, comprising:
at least one processor;
one or more memories coupled to the at least one processor and storing programming instructions, wherein the at least one processor is configured to execute the programming instructions to cause the network device to:
obtain an original segment list corresponding to a packet forwarding path, wherein the original segment list comprises original segment identifiers, and each of the original segment identifiers corresponds to one node or link on the packet forwarding path; and
generate a compressed segment list, wherein the compressed segment list comprises C compressed segment identifiers, and the compressed segment list is used to forward a packet along the packet forwarding path, wherein the C compressed segment identifiers are in a one-to-one correspondence with C original segment identifiers in the original segment list, first N bits in each of the C original segment identifiers are the same, a length of each of the C compressed segment identifiers is X bits, each of the C compressed segment identifiers comprises X bits following the first N bits in a corresponding original segment identifier, a sequence of the C compressed segment identifiers is same as a sequence of the C original segment identifiers, and a length of each of the C compressed segment identifiers is less than a length of a corresponding original segment identifier, and wherein N is a positive integer, X is a positive integer, and C is a positive integer.

2. The network device according to claim 1, wherein C is an integer greater than 1.

3. The network device according to claim 1, wherein the network device is a controller in a network, and the at least one processor is further configured to execute the programming instructions to cause the network device to:
generate a first control packet, wherein the first control packet comprises the compressed segment list; and
send the first control packet to a network ingress node.

4. The network device according to claim 1, wherein the network device is a network ingress node, and the at least one processor is further configured to execute the programming instructions to cause the network device to:
receive the original segment list from a controller;
receive a packet, wherein the packet is forwarded along the packet forwarding path; and
encapsulate the compressed segment list into the packet.

5. The network device according to claim 1, wherein each of the C original segment identifiers is a 128-bits segment routing Internet Protocol version 6 (IPv6) (SRv6) segment identifier.

6. The network device according to claim 1, wherein each of the C compressed segment identifiers does not comprise the first N bytes in a corresponding original segment identifier.

7. The network device according to claim 1, wherein the original segment list comprises S original segment identifiers, and C is less than S.

8. The network device according to claim 1, wherein the length of each of the C compressed segment identifiers is 32 bits.

9. The network device according to claim 1, wherein the length of each of the C compressed segment identifiers is 16 bits.

10. The network device according to claim 1, wherein N is 32, or N is 48.

11. A network device, comprising:
at least one processor;
one or more memories coupled to the at least one processor and storing programming instructions, wherein the at least one processor is configured to execute the programming instructions to cause the network device to:
obtain a compressed segment list comprising C compressed segment identifiers, wherein each of the C compressed segment identifiers corresponds to one node or link on a packet forwarding path, the C compressed segment identifiers are in a one-to-one correspondence with C original segment identifiers, first N bits in each of the C original segment identifiers are the same, a length of each of the C compressed segment identifiers is X bits, each of the C compressed segment identifiers comprises X bits following the first N bits in a corresponding original segment identifier, a sequence of the C compressed segment identifiers is same as a sequence of the C original segment identifiers, and a length of each of the C compressed segment identifiers is less than a length of a corresponding original segment identifier, and wherein N is a positive integer, X is a positive integer, and C is a positive integer;
receive a first packet, wherein the first packet is forwarded along the packet forwarding path;
encapsulate the compressed segment list into the first packet, to generate a second packet; and
send the second packet along the packet forwarding path.

12. The network device according to claim 10, wherein C is an integer greater than 1.

13. The network device according to claim 10, each of the C original segment identifiers is a 128 bits segment routing Internet Protocol version 6 (IPv6) (SRv6) segment identifier.

14. The network device according to claim 1, wherein each of the C compressed segment identifiers does not comprise the first N bytes in a corresponding original segment identifier.

15. The network device according to claim 10, wherein the length of each of the C compressed segment identifiers is 32 bits.

16. A method, comprising:
obtaining, by a network device, an original segment list corresponding to a packet forwarding path, wherein the original segment list comprises original segment identifiers, and each of the original segment identifiers corresponds to one node or link on the packet forwarding path; and
generating, by the network device, a compressed segment list, wherein the compressed segment list comprises C compressed segment identifiers, and the compressed segment list is used to forward a packet along the packet forwarding path, wherein the C compressed segment identifiers are in a one-to-one correspondence with C original segment identifiers in the original segment list, first N bits in each of the C original segment identifiers are the same, a length of each of the C compressed segment identifiers is X bits, each of the C compressed segment identifiers comprises X bits following the first N bits in a corresponding original segment identifier, a sequence of the C compressed segment identifiers is same as a sequence of the C original segment identifiers, and a length of each of the C compressed segment identifiers is less than a length of a corresponding original segment identifier, and wherein N is a positive integer, X is a positive integer, and C is a positive integer.

17. The method according to claim 16, wherein C is an integer greater than 1.

18. The method according to claim 16, wherein the network device is a controller in a network, and the method further comprises:
generating, by the network device, a first control packet, wherein the first control packet comprises the compressed segment list; and
sending, by the network device, the first control packet to a network ingress node.

19. The method according to claim 16, wherein the network device is a network ingress node, and the method further comprises:
receiving, by the network device, the original segment list from a controller;
receiving, by the network device, a packet, wherein the packet is forwarded along the packet forwarding path; and
encapsulating, by the network device, the compressed segment list into the packet.

20. The method according to claim 16, each of the C original segment identifiers is a 128-bits segment routing Internet Protocol version 6 (IPv6) (SRv6) segment identifier.

21. The method according to claim 16, wherein each of the C compressed segment identifiers does not comprise the first N bytes in a corresponding original segment identifier.

22. The method according to claim 16, wherein the original segment list comprises S original segment identifiers, C is less than S.

23. The method according to claim 16, wherein the length of each of the C compressed segment identifiers is 32 bits.

24. The method according to claim 16, wherein the length of each of the C compressed segment identifiers is 16 bits.

25. The method according to claim 16, wherein N is 32, or N is 48.

26. A packet processing method, comprising:
obtaining, by a network device, a compressed segment list comprising C compressed segment identifiers, wherein each of the C compressed segment identifiers corresponds to one node or link on a packet forwarding path, the C compressed segment identifiers are in a one-to-one correspondence with C original segment identifiers, first N bits in each of the C original segment identifiers are the same, a length of each of the C compressed segment identifiers is X bits, each of the C compressed segment identifiers comprises X bits following the first N bits in a corresponding original segment identifier, a sequence of the C compressed segment identifiers is same as a sequence of the C original segment identifiers, and a length of each of the C compressed segment identifiers is less than a length of a corresponding original segment identifier, and wherein N is a positive integer, X is a positive integer, and C is a positive integer;

receiving, by the network device, a first packet, wherein the first packet is forwarded along the packet forwarding path;

encapsulating, by the network device, the compressed segment list into the first packet, to generate a second packet; and sending, by the network device, the second packet along the packet forwarding path.

27. The method according to claim 26, wherein C is an integer greater than 1.

28. The method according to claim 26, each of the C original segment identifiers is a 128 bits segment routing Internet Protocol version 6 (IPv6) (SRv6) segment identifier.

29. The method according to claim 26, wherein each of the C compressed segment identifiers does not comprise the first N bytes in a corresponding original segment identifier.

30. The method according to claim 26, wherein the length of each of the C compressed segment identifiers is 32 bits.

\* \* \* \* \*